US012616331B2

(12) United States Patent
Molinaro et al.

(10) Patent No.:  US 12,616,331 B2
(45) Date of Patent:     May 5, 2026

(54) MOTORIZED BREWING UNIT

(71) Applicant: LUIGI LAVAZZA S.P.A., Turin (IT)

(72) Inventors: Gabriele Molinaro, Turin (IT); Denis Rotta, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 749 days.

(21) Appl. No.: 17/922,200

(22) PCT Filed: Jun. 16, 2021

(86) PCT No.: PCT/IB2021/055298
§ 371 (c)(1),
(2) Date: Oct. 28, 2022

(87) PCT Pub. No.: WO2021/255656
PCT Pub. Date: Dec. 23, 2021

(65) Prior Publication Data
US 2023/0180960 A1     Jun. 15, 2023

(30) Foreign Application Priority Data

Jun. 17, 2020     (IT) ........................ 102020000014425

(51) Int. Cl.
*A47J 31/44* (2006.01)
*A47J 31/06* (2006.01)
*A47J 31/36* (2006.01)
(52) U.S. Cl.
CPC ....... *A47J 31/4492* (2013.01); *A47J 31/3633* (2013.01); *A47J 2031/0694* (2013.01); *A47J 31/3623* (2013.01)
(58) Field of Classification Search
CPC ............ A47J 2031/0694; A47J 31/4492; A47J 31/3633; A47J 31/3638; A47J 31/3623
(Continued)

(56) References Cited

U.S. PATENT DOCUMENTS 10,952,562 B2 * 3/2021 Tanner ................ A47J 31/4492
2012/0055343 A1    3/2012 Remo et al.
(Continued)

FOREIGN PATENT DOCUMENTS

CN      104023604 A  *  9/2014  ......... A47J 31/3633
EP      3 028 608 A1    6/2016
(Continued)

OTHER PUBLICATIONS

Extended European Search Report dated Sep. 26, 2024 in Application No. 24180181.0.
(Continued)

*Primary Examiner* — Brian W Jennison
(74) *Attorney, Agent, or Firm* — Sughrue Mion, PLLC

(57)     ABSTRACT

A motorized brewing unit for preparing beverages from a powdered product has a dispensing assembly having a first assembly part provided with a receptacle adapted to receive the powdered product, and a second assembly part, relative to which the first assembly part is movable between an open position and a closed position in which the first assembly part and the second assembly part are coupled to each other to define a brewing chamber therebetween. The motorized brewing unit has an electric motor that controls movement of the first assembly part between the open position and the closed position and a readout device that provides a digital image of the powdered product. The readout device has an optical sensor. The receptacle faces the optical sensor when the first assembly part is in a detection position, intermediate between the open position and the closed position.

20 Claims, 19 Drawing Sheets

(58) Field of Classification Search
USPC .................................................... 99/285, 295
See application file for complete search history.

(56) References Cited

U.S. PATENT DOCUMENTS

| | | | |
|---|---|---|---|
| 2013/0247769 A1 | 9/2013 | Agon | |
| 2015/0017288 A1 | 1/2015 | Lo Faro et al. | |
| 2016/0166105 A1 | 6/2016 | Bugnano et al. | |
| 2017/0196397 A1 | 7/2017 | Flick et al. | |
| 2018/0344075 A1 | 12/2018 | Zwicker et al. | |
| 2022/0330742 A1* | 10/2022 | Loannidis ........... | A47J 31/4492 |

FOREIGN PATENT DOCUMENTS

| | | | | |
|---|---|---|---|---|
| EP | 3338600 A1 * | 6/2018 | ............ | A47J 31/468 |
| JP | 7669390 B2 | 4/2025 | | |
| WO | WO-2015091301 A1 * | 6/2015 | .......... | A47J 31/4492 |
| WO | WO-2020089404 A1 * | 5/2020 | .......... | A47J 31/3628 |

OTHER PUBLICATIONS

Extended European Search Report dated Sep. 27, 2024 in Application No. 24180180.2.
International Search Report of PCT/IB2021/055298 dated Oct. 5, 2021 [PCT/ISA/210].
Written Opinion of PCT/IB2021/055298 dated Oct. 5, 2021 [PCT/ISA/237].
Communication dated Jan. 20, 2026 in Japanese Application No. 2025-067247.

* cited by examiner

FIG.19
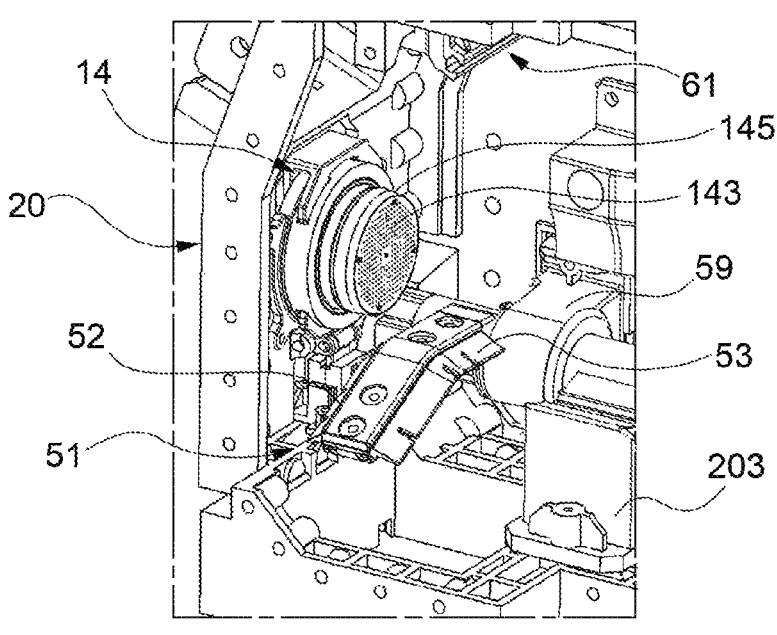
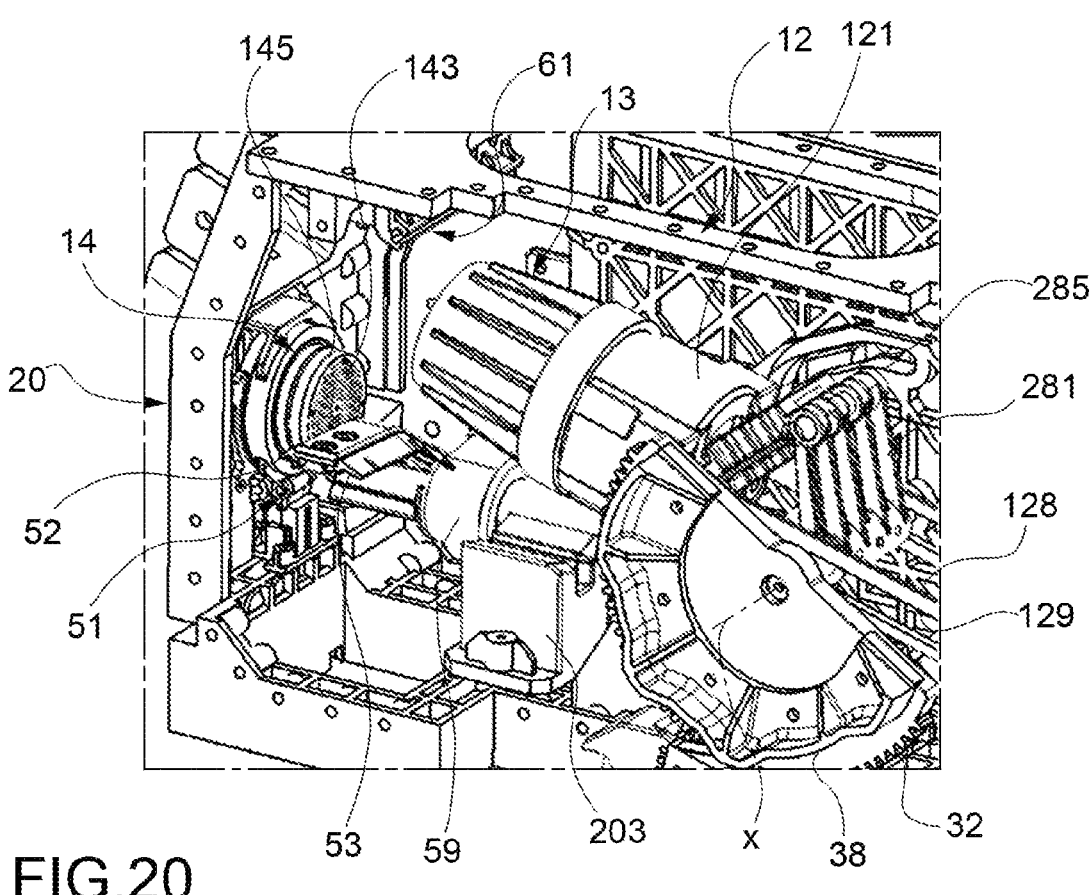
FIG.20

MOTORIZED BREWING UNIT

CROSS-REFERENCE TO RELATED APPLICATIONS

This application is a National Phase Application of PCT International Application No. PCT/IB2021/055298, having an International Filing Date of Jun. 16, 2021, claiming priority to Italian Patent Application No. 102020000014425, filed Jun. 17, 2020 each of which is hereby incorporated by reference in its entirety.

FIELD OF THE INVENTION

The present invention relates to a motorized brewing unit for a machine for preparing beverages through the use of a powdered product containing one or more ingredients, in particular coffee.

In the following description, reference will be made for simplicity to the use of a compacted tablet, but it is obvious that the present invention is not limited to a brewing unit capable of operating with tablets but rather is applicable more generally also to brewing units using capsules or, alternatively, pods, or even a powdered product.

BACKGROUND OF THE INVENTION

Machines for the preparation of beverages are known comprising a motorized brewing unit, wherein the brewing unit comprises two parts adapted to define a brewing chamber and an electric motor designed to control, by means of a driving mechanism, the relative movement of the two parts between an open position, wherein the two parts are spaced apart to allow the insertion of a capsule, and a closed position, wherein the two parts are coupled to each other to enclose the brewing chamber.

SUMMARY OF THE INVENTION

The object of the present invention is to provide an improved motorized brewing unit.

This and other objects are fully achieved according to the present invention by a brewing unit and a process for preparing a beverage as described and claimed herein.

Advantageous embodiments of the brewing unit according to the present invention and advantageous modes of carrying out the method according to the present invention are also described.

In summary, the invention relates to a motorized brewing unit for the preparation of beverages from a powdered product containing at least one ingredient, comprising a dispensing assembly which includes a first assembly part having a receptacle adapted to receive the powdered product, and a second assembly part, relative to which the first assembly part is movable between an open position, wherein the first assembly part and the second assembly part are spaced away from each other to allow the insertion of the powdered product, and a closed position, wherein the first assembly part and the second assembly part are coupled to each other to define a brewing chamber therebetween, an electric motor adapted to control the movement of the first assembly part with respect to the second assembly part between the open position and the closed position, wherein the dispensing assembly further comprises readout means adapted to make available a digital image of the powdered product, the readout means comprising an optical sensor which the receptacle faces in a detection position, intermediate between the open position and the closed position.

Thus, in the aforesaid unit the optical sensor does not face the brewing chamber that is formed when the dispensing assembly is closed, and therefore it is not necessary to provide for particular measures to prevent any residue generated by the brewing process from disturbing a correct functioning of the optical sensor. This results in obvious advantages from the point of view of the design of the brewing unit and, more particularly, of the brewing chamber.

Preferably, the brewing unit further comprises an electronic control unit configured to adjust brewing parameters based on said digital image of the powdered product.

BRIEF DESCRIPTION OF THE FIGURES

Further features and advantages of this invention will be clarified by the detailed description that follows, given purely by way of non-limiting example in reference to the accompanying drawings, wherein:

FIGS. 19 to 22 are perspective views of the interior of the brewing unit, showing different positions of a blade member corresponding to different positions of the first assembly part;

DETAILED DESCRIPTION

Figure 1:
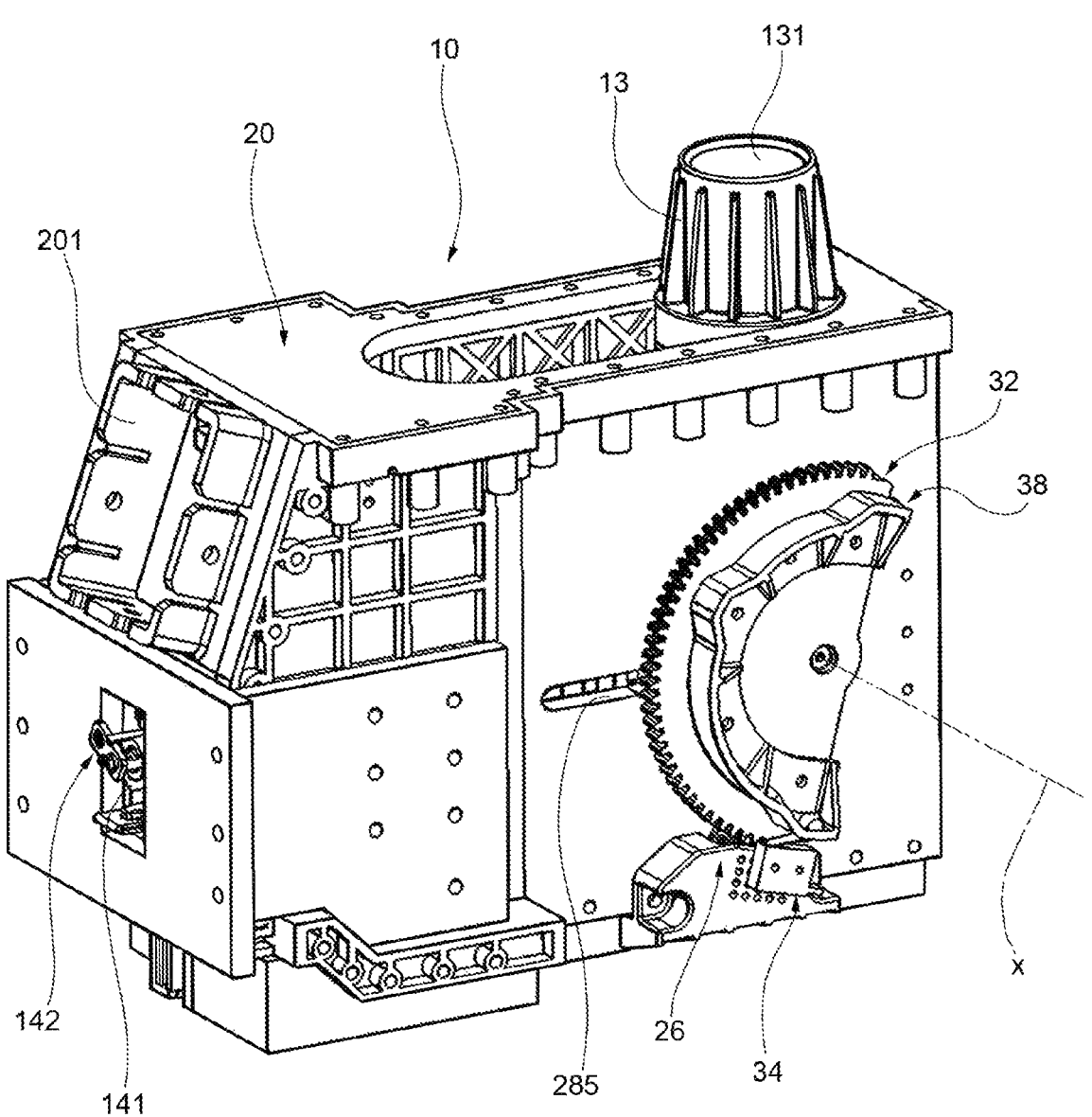
FIG. 1 is a perspective view of a brewing unit according to the present invention.

Referring to FIG. 1, a brewing unit for a machine for preparing beverages, in particular coffee, from a compacted tablet containing one or more ingredients, in particular coffee powder, is collectively denoted as 10.

As explained above, although the present invention is described with reference to the use of a compacted tablet containing the ingredient, or ingredients, for the preparation of the beverage, it is not to be understood as limited to a brewing unit suitable for operation with a tablet, but rather as including also the case where in place of a tablet there is provided a dose of powder contained in a capsule, pod, or other similar package suitable for the preparation of beverages by brewing. For the purposes of the present invention, the term "powdered product" therefore covers both the bulk powdered product and the powdered product packaged in capsule or pod form or compacted into tablet form.

Figures 2, 3:
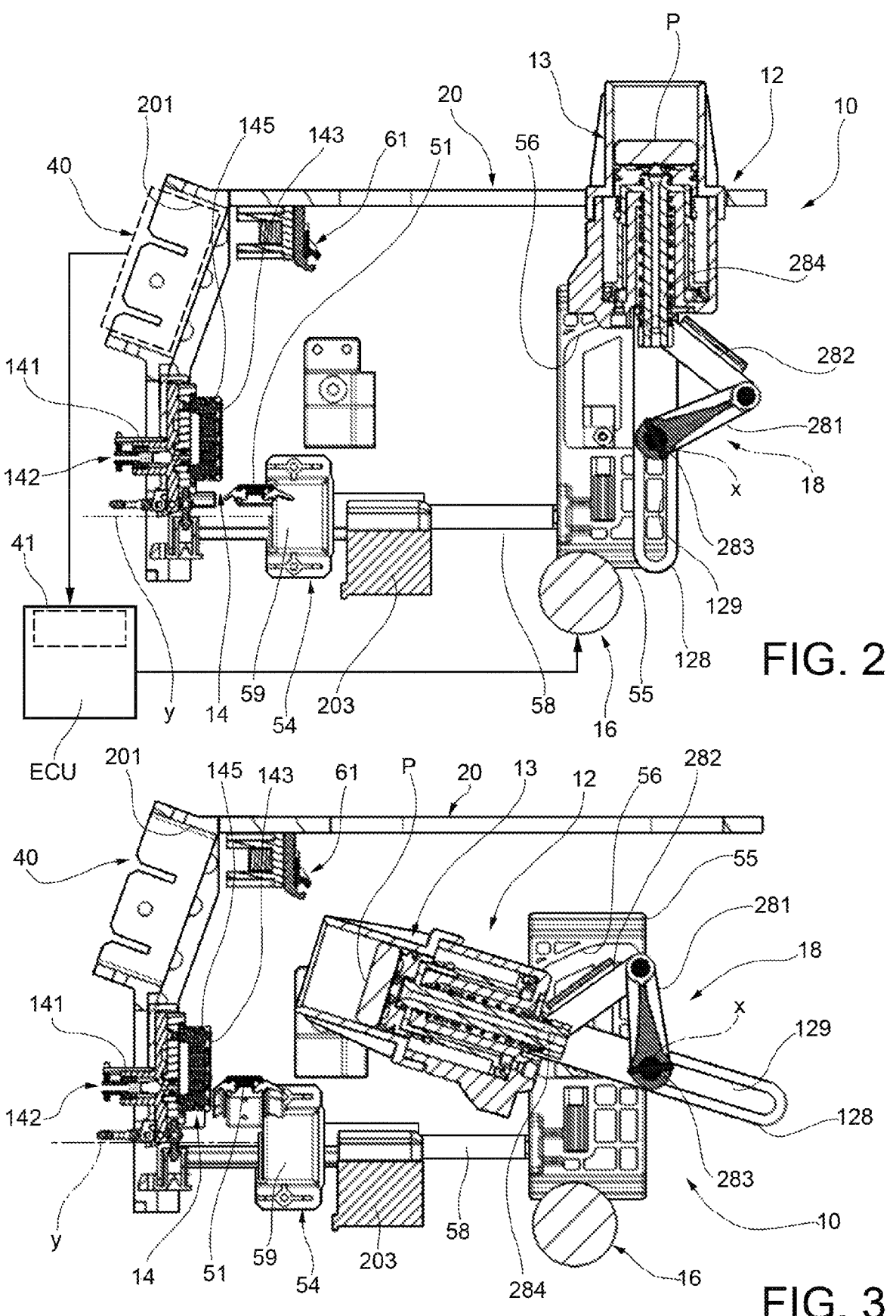
FIGS. 2 to 5 are cross-sectional views illustrating different operating positions of a dispensing assembly of the brewing unit in FIG. 1.

Referring to FIG. 2, the brewing unit 10 comprises a dispensing assembly including a first movable assembly part 12 and a second stationary assembly part 14, an electric motor 16 adapted to drive the relative movement of the first assembly part 12, a driving mechanism 18 interposed between the electric motor 16 and the first assembly part 12, and a support structure 20 supporting the first assembly part 12, the second assembly part 14, the electric motor 16, and the driving mechanism 18.

The second assembly part 14 is stationary, i.e., fixed relative to the support structure 20, while the first assembly part 12 is movable, in particular along a trajectory comprising a curvilinear and a rectilinear stretch, between an open position (shown in FIG. 2), wherein the first assembly part 12 is spaced apart from the second assembly part 14 to allow the introduction of a tablet P, and a closed position (shown in FIG. 4), wherein the first assembly part 12 is coupled with the second assembly part 14 to jointly define a brewing chamber therewith, passing through a plurality of intermediate positions (as shown in FIGS. 2 to 5).

The first assembly part 12 has a receptacle 13 adapted to receive the tablet P and to form, together with the second assembly part 14, the brewing chamber.

Figures 4, 5:
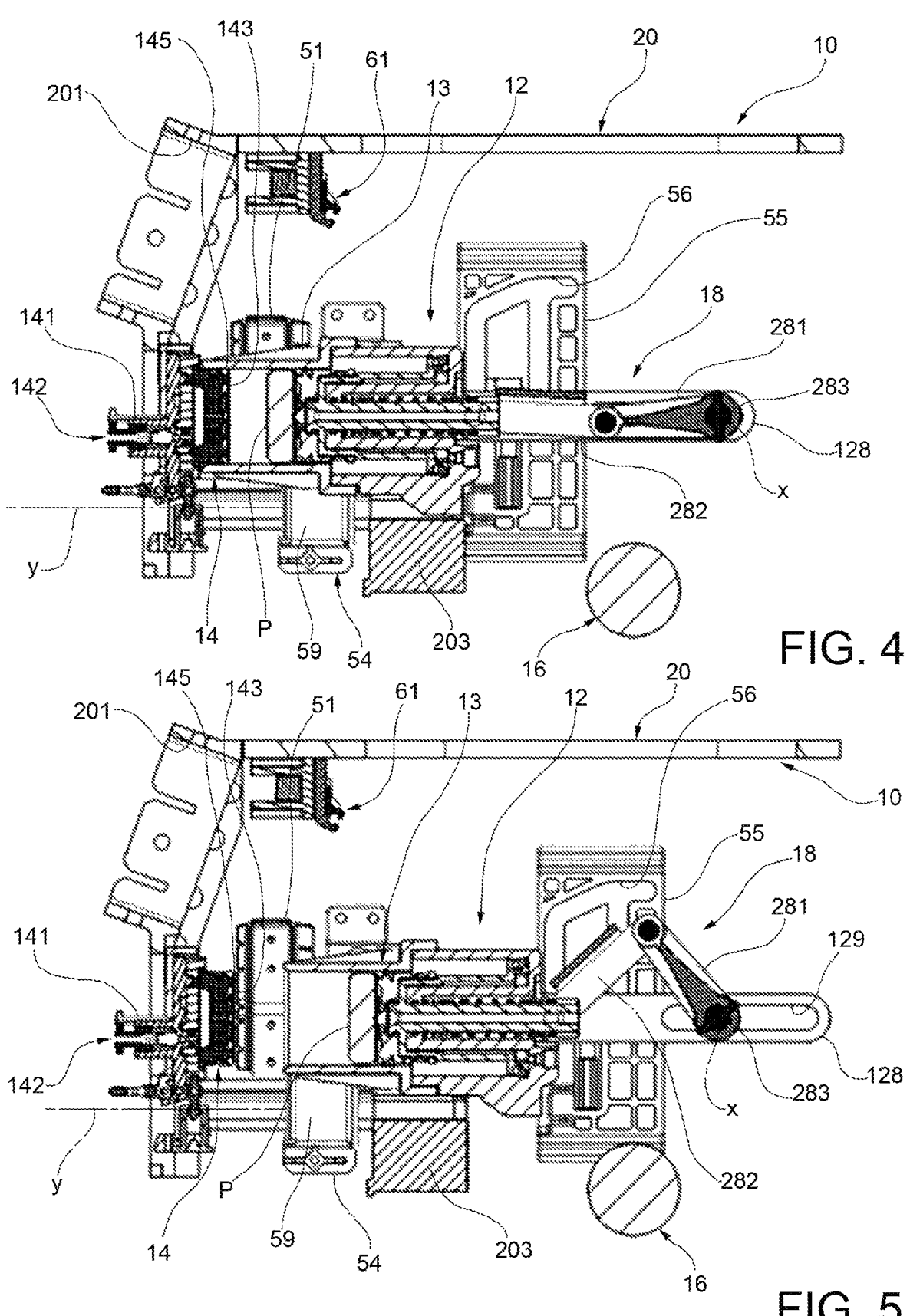

As may be seen in FIGS. 2 and 4, the first assembly part 12 in the open position is arranged substantially vertically to facilitate insertion of the tablet P into the receptacle 13, while in the closed position it is arranged substantially horizontally, aligned with the second assembly part 14. In moving between the open position and the closed position, the first assembly part 12 thus rotates by an angle of about 90°. The rotation axis of the first assembly part 12 is indicated with x in the figures.

Figure 6:
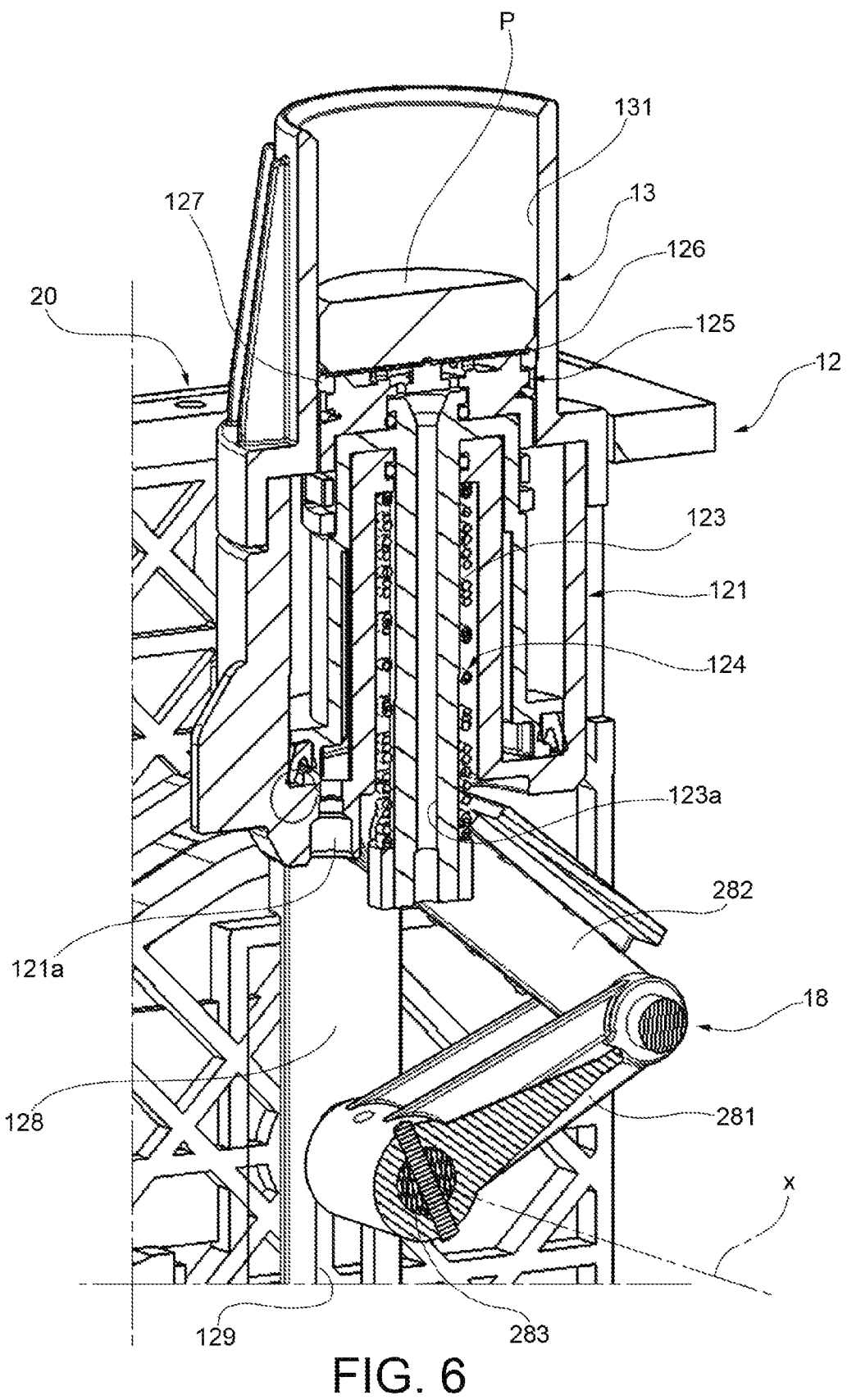
FIGS. 6 and 7 are cross-sectional views illustrating a first assembly part of the dispensing assembly.
Figures 7, 8:
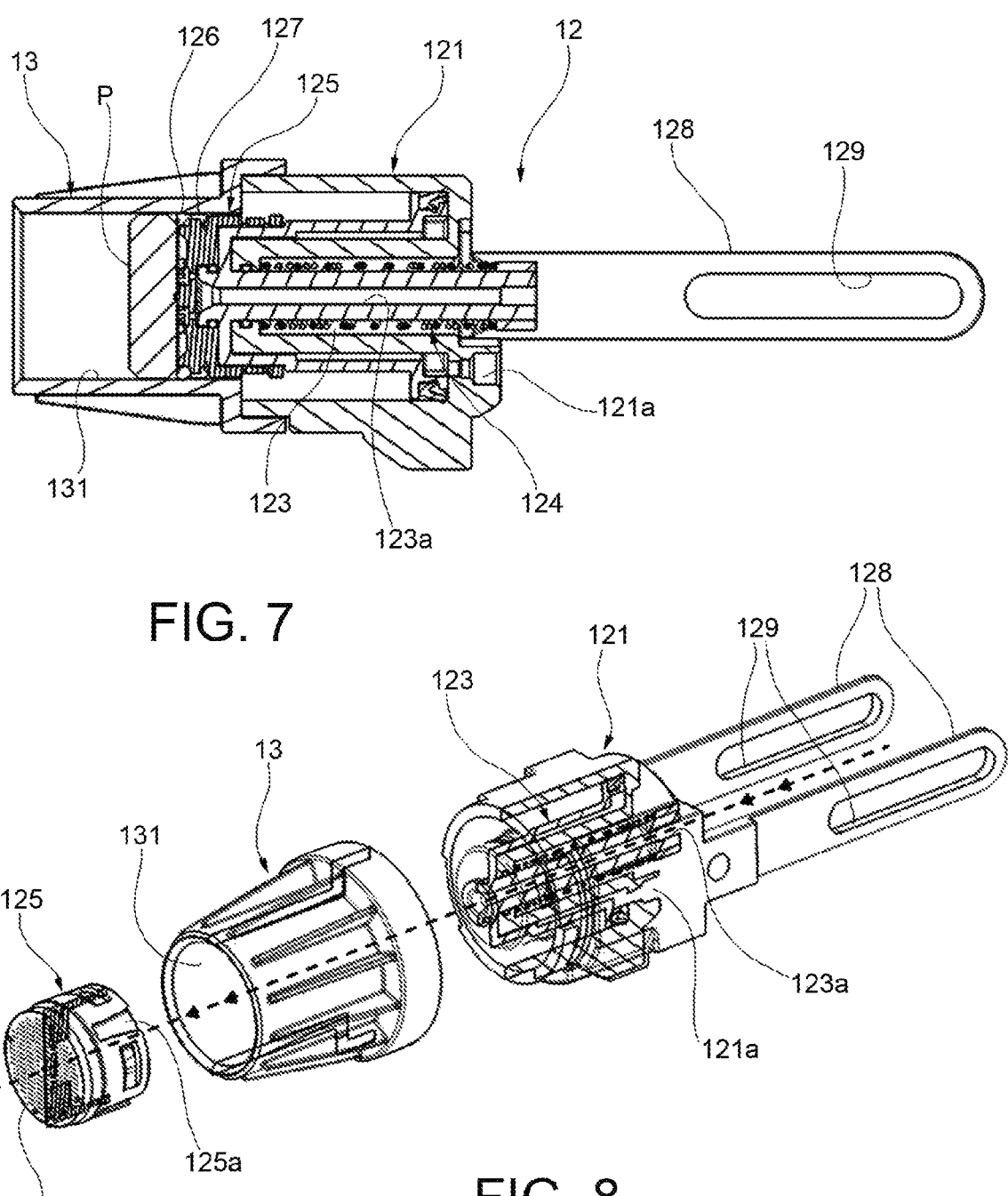
FIG. 8 is an exploded view of the first assembly part.

With reference to FIGS. 6 and 7, the first assembly part 12 is illustrated. The first assembly part 12 comprises a hydraulic cylinder 121, in which a plunger 123, sliding along a rectilinear direction, is mounted. An inlet 121a is shown in FIGS. 6 and 7, through which the hydraulic cylinder 121 may be fed with a liquid, in particular water, through ducts not shown, to control the advancement of the plunger 123 from its retracted position shown in FIGS. 6 and 7. This advancement is counteracted by elastic means 124 which comprise in particular a coil spring and are interposed between the plunger 123 and the bottom side of the hydraulic cylinder 121. Such elastic means 124 are therefore arranged to bias the plunger 123 toward the retracted position thereof.

The receptacle 13 is mounted on the plunger side of the hydraulic cylinder 121, whereby the plunger 123 is able to slide within the receptacle 13. A brewing head 125 integral with the plunger 123 is arranged on the plunger 123. Ducts are provided in the brewing head 125 for injecting water into the brewing chamber, as will be described hereinbelow. Also arranged on the brewing head 125 is a brewing interface 126 adapted to come into contact with the tablet P. In the illustrated example, the brewing interface 126 is constructed as a filter, and will be designated as an inlet filter hereinafter. In the event that the brewing unit is intended for operation with a capsule, the brewing interface could be constructed as an element provided with tips for piercing the capsule casing.

The ducts of the brewing head 125 are connected with a central duct 123a formed through a rod of the plunger 123, which is in turn adapted to be connected to a water supply duct (not shown).

Between the brewing head 125 and an inner lateral surface 131 of the receptacle 13 a gasket 127 is arranged integral with the brewing head 125, and thus slidable in contact with the inner lateral surface 131 of the receptacle 13. Advantageously, the gasket 127 exerts a scraping and cleaning action on the inner lateral surface 131 of the receptacle 13 during sliding of the brewing head 125.

Figure 9A:
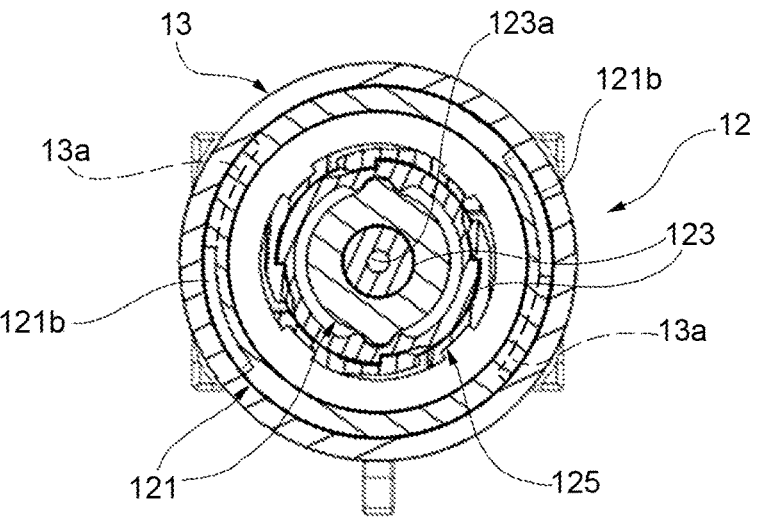
FIGS. 9a, 9b and 10 are cross-sectional views taken at different locations along a longitudinal axis of the first assembly part.
Figure 9B:
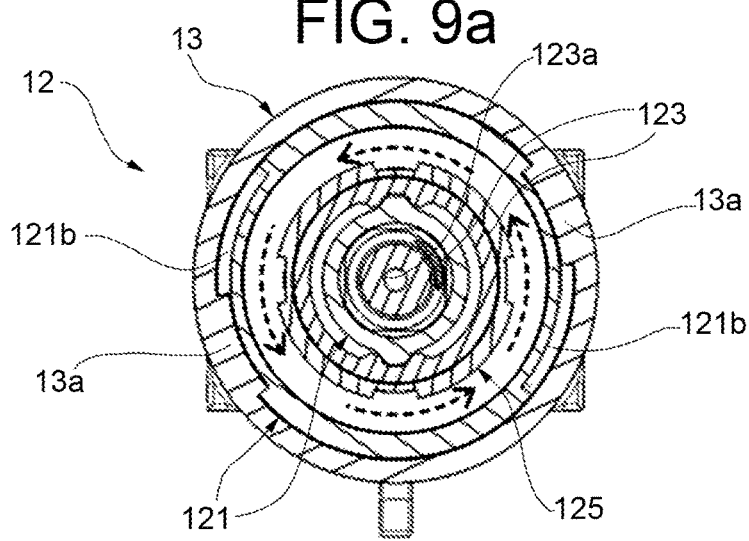
Figure 10:
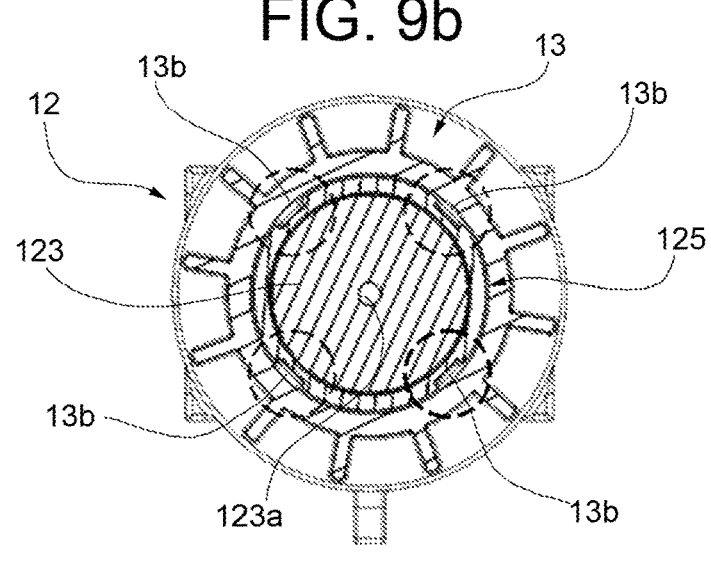

Referring to FIG. 8, the brewing head 125 is releasably mounted on the plunger 123, and the receptacle 13 is releasably mounted on the hydraulic cylinder 121. In particular, FIGS. 9a and 9b show that the receptacle 13 is attached to the hydraulic cylinder 121 by bayonet coupling. Thus, the receptacle 13 has a pair of engagement teeth 13a projecting radially inward and inserted into respective L-shaped grooves 121b formed on a radially outer surface of the hydraulic cylinder 121. The brewing head 125 is snapped onto the plunger 123. FIG. 10 shows that a plurality of constraining teeth 13b are further formed on an inner surface of the receptacle 13, which engage—when the plunger 123 and the brewing head 125 are in the retracted position—respective axial grooves 125a formed on a radially outer surface of the brewing head 125.

The first assembly part 12 further comprises a pair of line blocks 128 extending from the hydraulic cylinder 121, and in which respective rectilinear guide grooves 129 are formed. The guide grooves 129 extend along a direction parallel to the sliding direction of the plunger 123.

Returning to FIGS. 2 to 5, the driving mechanism 18 is arranged between the electric motor 16 and the first assembly part 12 to transmit the motion generated by the electric motor 16 to said assembly part, whereby, when the electric motor 16 is supplied with a given voltage, the first assembly part 12 moves with respect to the second assembly part 14 in the direction from the open position to the closed position, whereas, when the electric motor 16 is supplied with a voltage inverse to the previous one, the first assembly part 12 moves with respect to the second assembly part 14 in the opposite direction, i.e., in the direction from the closed position to the open position.

The driving mechanism 18 comprises a reduction assembly 26 and a motion conversion assembly 28.

Figure 11:
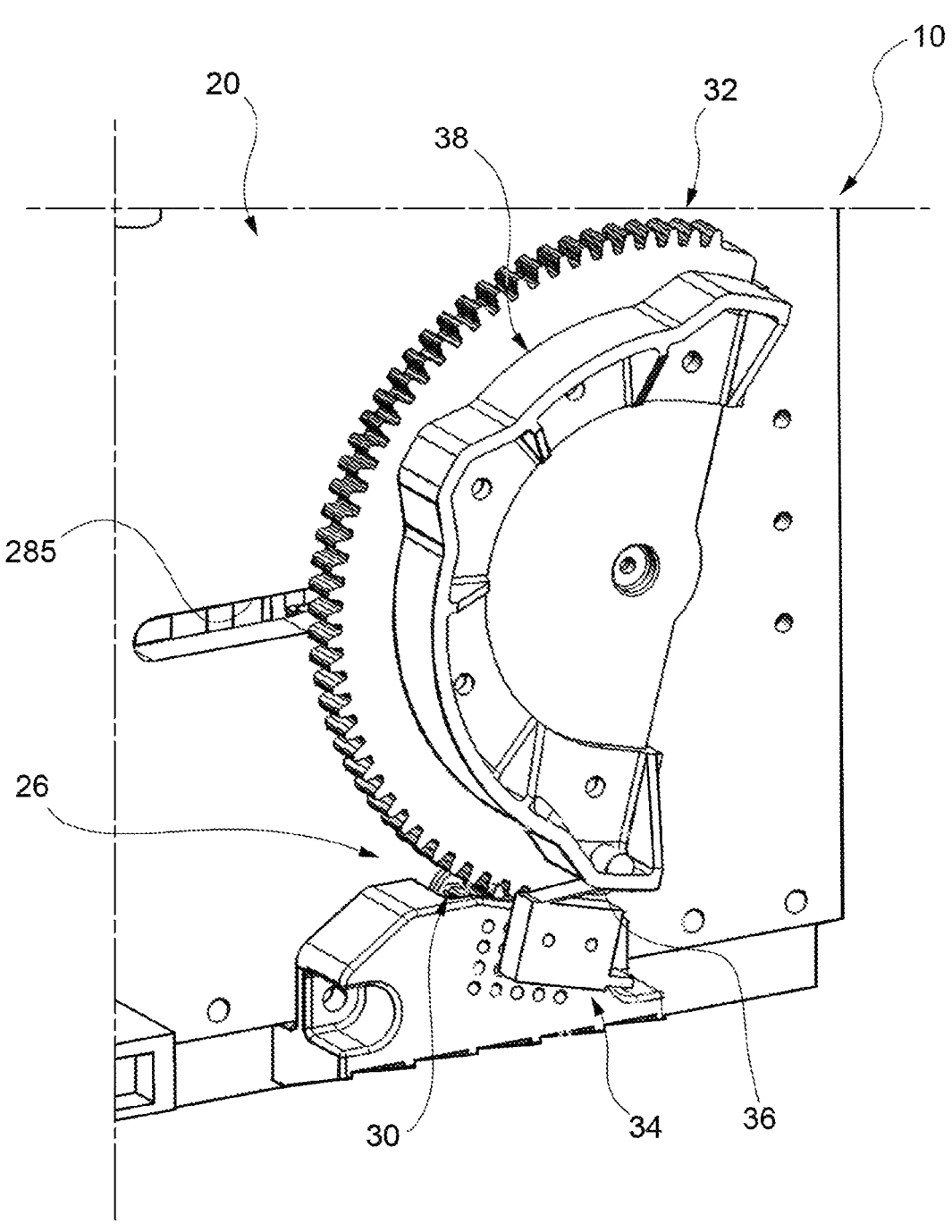
FIGS. 11, 12 and 13 are perspective views showing a driving gear, with which a cam member and a position sensor are associated for detecting the position of the first assembly part.
Figure 12:
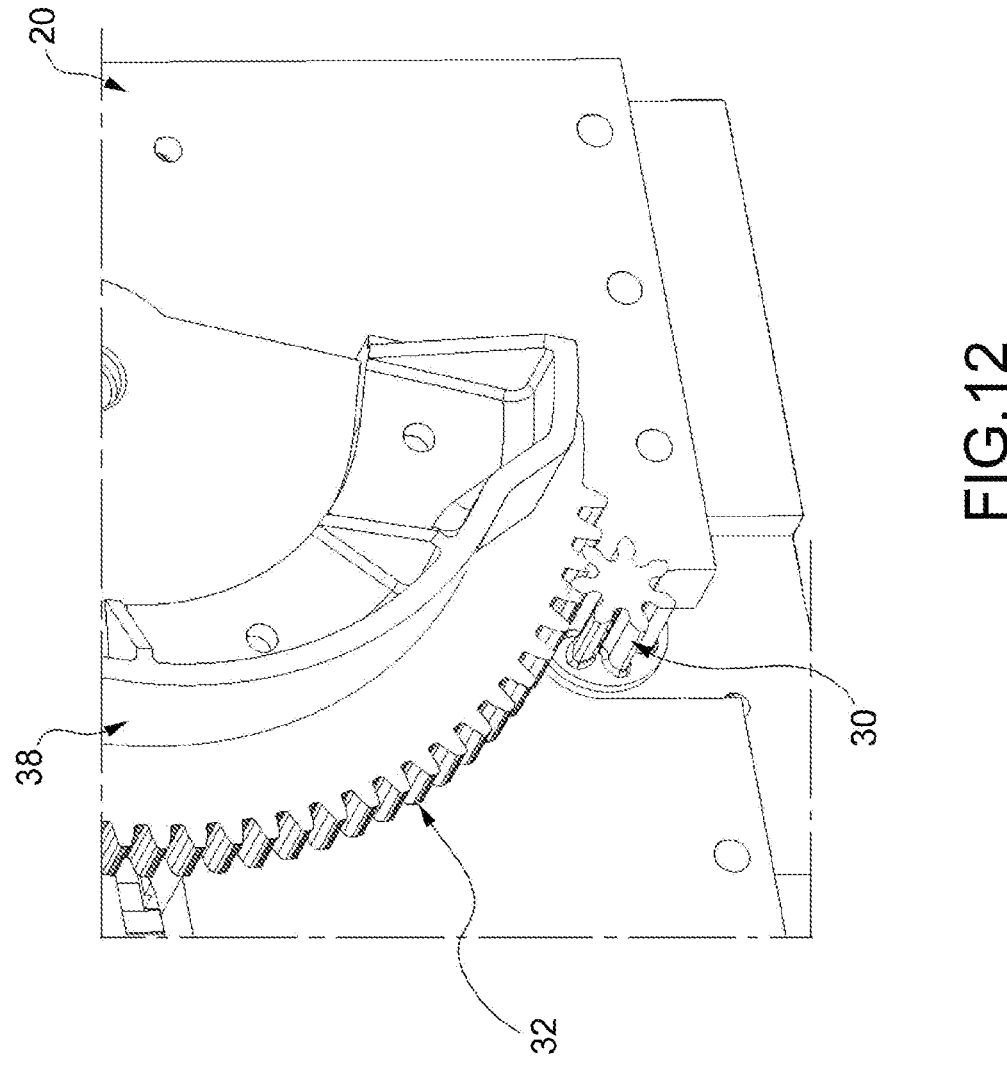
Figures 13, 14:
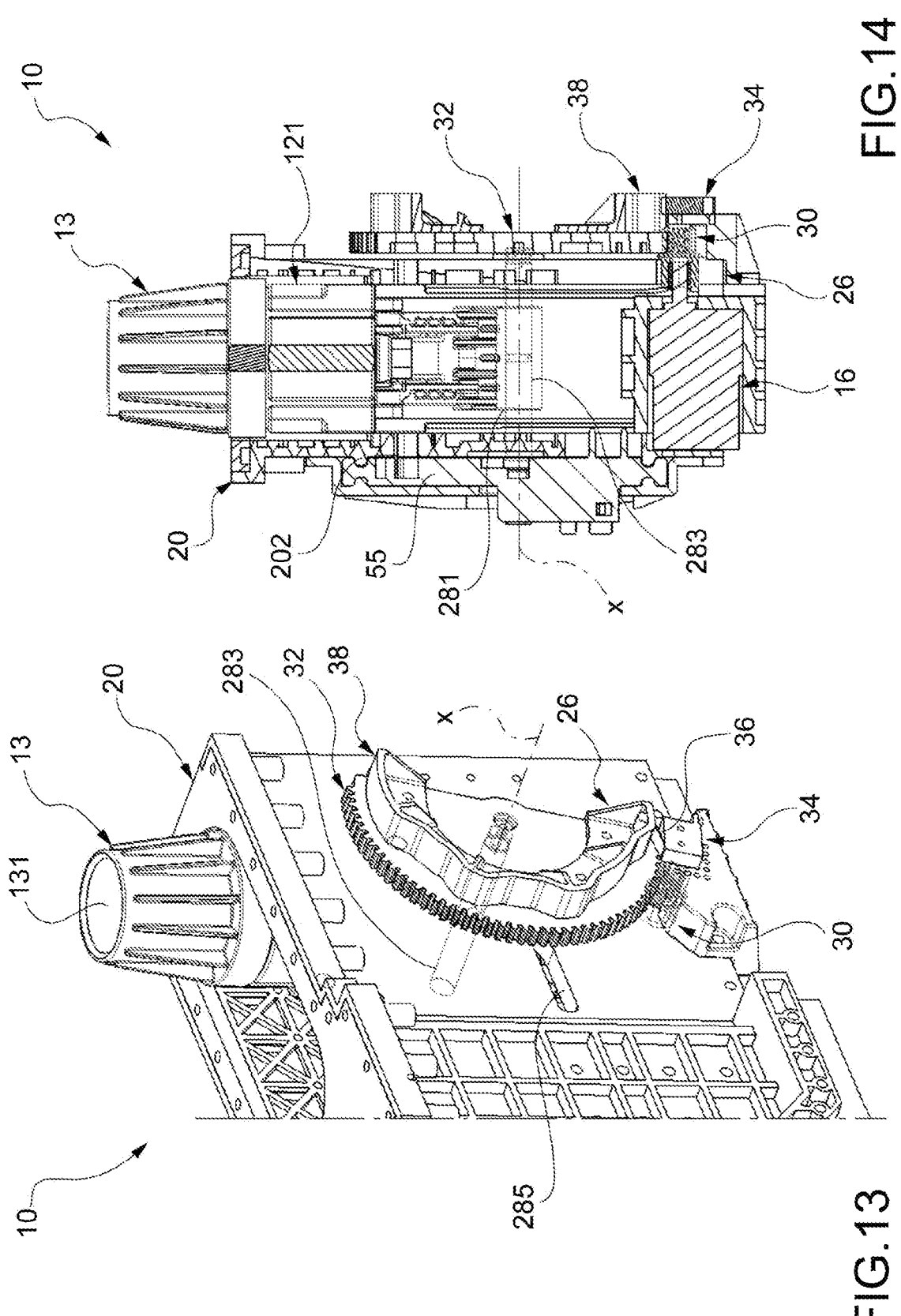
FIG. 14 is a cross-sectional view of an electric motor for moving the first assembly part.

With reference also to FIGS. 11 to 13, the reduction assembly 26 is preferably formed as a gear reduction assembly comprising a pinion 30, which is fitted to a shaft of the electric motor 16 to be rotatably driven by said motor, and a gear wheel 32 (or rather, as in the illustrated embodiment, a gear wheel sector) meshing with the pinion 30. One or more intermediate gear wheels may be interposed between the pinion 30 and the gear wheel 32.

Figure 24:
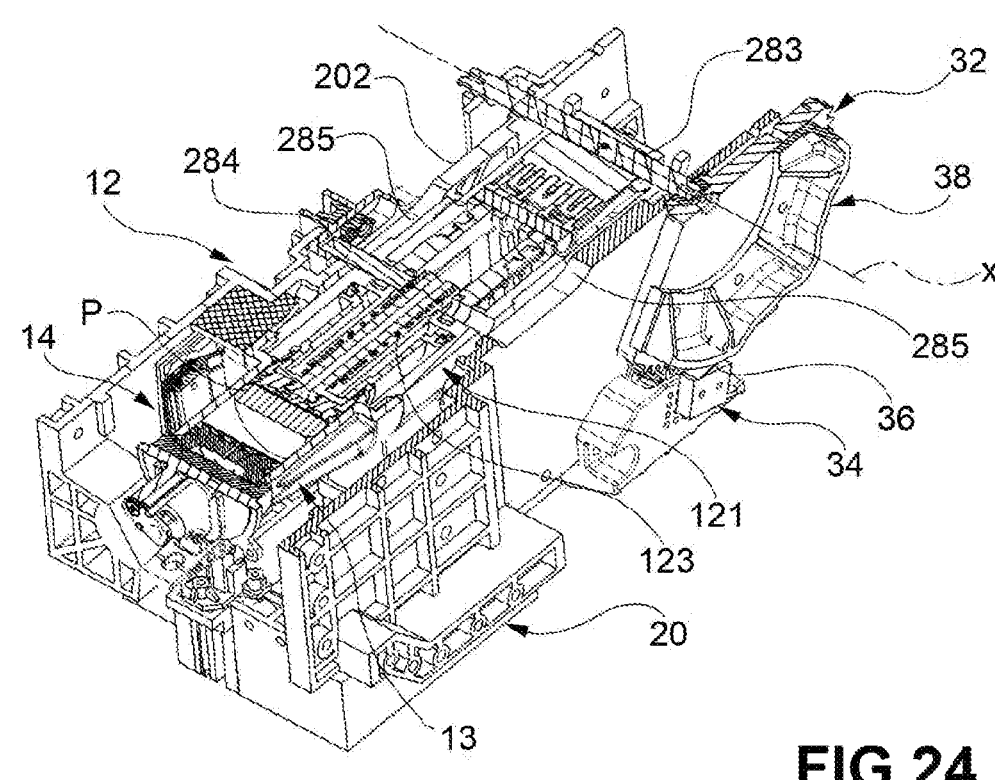

Referring to FIGS. 2-6 and 13-14, the motion conversion assembly 28 is configured to convert the rotational motion of the end element (driven gear wheel) of the reduction assembly 26 into the rotational and translational motion of the first assembly part 12. In the illustrated example, the motion conversion assembly 28 comprises a toggle mechanism comprising a first toggle member 281 and a second toggle member 282 hinged to each other. The first toggle member 281 is rotatably integral with a shaft 283, which is in turn rotatably integral with the gear wheel 32. The shaft 283 therefore defines the rotation axis x of the first assembly part 12 and the gear wheel 32. The shaft 283 is housed in the guide grooves 129 of the line blocks 128 of the first assembly part 12. The second toggle member 282 is hinged to the first assembly part 12, more specifically to the hydraulic cylinder 121, via a hinge pin 284. An extension of the hinge pin 284 engages a guide slot 285 formed in a lateral wall 202 of the support structure 20, as is shown in FIG. 24.

By virtue of the arrangement described above, the angular position of the gear wheel 32 is associated with a related position of the first assembly part 12 relative to the second assembly part 14.

The second assembly part 14 is attached to the support structure 20 and has a system of beverage dispensing ducts, which flow into a main dispensing duct 141, in which a pre-brewing valve 142 with preload is arranged. An outlet filter 143 is arranged on the second assembly part 14, which acts as an interface between the second assembly part 14 and the brewing chamber. A radial gasket 145 is arranged around one end of the second assembly part 14. In the closed condition of the dispensing assembly, said radial gasket 145 exerts a seal against the radially inner surface 131 of the receptacle 13.

Referring specifically to FIG. 11, the brewing unit 10 further comprises a microswitch 34, the operational state of which is operatively associated with the angular position of the gear wheel 32. In particular, the operational state of the microswitch 34 is switchable between two values or states, an ON operational state and an OFF operational state, respectively, for example by means of the mechanical action of a probe member 36 associated with the gear wheel 32.

More specifically, according to the exemplifying embodiment shown in the figures, the brewing unit 10 comprises a cam member 38 having a profile with a plurality of protuberances and recesses, arranged alternately with each other and each associated with a respective step of moving the first part 12 with respect to the second part 14 between the open position and the closed position. The cam member 38 is connected integrally in rotation to the gear wheel 32 whereby the angular position of the cam member 38 is uniquely associated with the angular position of the gear wheel 32.

The various positions of the gear wheel 32 correspond to the positions of the first assembly part 12 depicted in FIGS. 2-5, respectively. In the illustrated example, the profile of the cam member 38 has four protuberances alternating with three recesses, namely, a first protuberance 38*a*, a first recess 38*b*, a second protuberance 38*c*, a second recess 38*d*, a third protuberance 38*e*, a third recess 38*f*, and a fourth protuberance 38*g*. Obviously, the number of protuberances and recesses may also be different.

Specifically, the cam member 38 is, according to the embodiment shown in FIGS. 15 to 18, arranged on a radially outer side of the gear wheel 32. In this case, the recesses are located at a first radial distance from the center of rotation of the gear wheel 32, whereas the protuberances are located at a second radial distance from the center of rotation of the gear wheel 32, which is greater than the first radial distance.

Due to the configuration of the microswitch 34, the probe member 36, and the cam member 38 described above, the operational state of the microswitch 34 switches between ON and OFF during the rotation of the gear wheel 32. In effect, as the gear wheel 32 rotates, the probe member 36 comes into contact with a subsequent protuberance or recess, thus causing the operational state O of the microswitch 34 to change from ON to OFF or vice versa.

The brewing unit 10 further comprises an electronic control unit ECU (schematically shown only in FIG. 2) designed to control the electric motor 16.

In particular, the electronic control unit ECU is programmed to associate with each switching of the operational state of the microswitch 34 the achievement of a subsequent step of moving the first assembly part 12 relative to the second assembly part 14 and, depending on the step of the movement achieved, to control the electric motor 16 according to a given speed profile.

The brewing unit 10 may further comprise an optical sensor 40, shown schematically only in FIGS. 2-5. The optical sensor 40 is housed in a seat 201 formed on the support structure 20. The optical sensor 40 is positioned whereby the receptacle 13 faces it when the first assembly part 12 is in a detection position, intermediate between the open position and the closed position and depicted in FIGS. 3 and 16. In the detection position, the interior of the receptacle 13, and thus the tablet P therein, falls within the field of view of the optical sensor 40. The optical sensor 40 is connected to a circuit 41, controlled by the electronic control unit ECU, and cooperates therewith to make available a digital image of the tablet P. The electronic control unit ECU is therefore programmed to perform a recognition of the product contained in the receptacle 13, for example by reading an identification code or drawing affixed to the product, or other surface features of the product. In the case of bulk product or compacted tablets, the readout may comprise a recognition of blend, roast, and grind type based on the color and grains of the powder. The readout may be taken dynamically, and thus with the first assembly part 12 being detected without stopping at the detection position. In an alternative embodiment, the readout may be taken statically, with the first assembly part 12 momentarily stopping at the detection position.

In case of successful recognition of the tablet, the ECU is programmed to cause the first assembly part 12 to proceed and adjust the brewing parameters based on the recognized tablet. These parameters may be, for example, the amount of water to be injected into the brewing chamber, or the stroke to impart on the plunger 123 before the brewing phase, as will be described below.

In the event of failed recognition, a repeat readout may be envisaged. In the case of a dynamic readout, this repeat may take place at a slower speed. In the event of failed recognition after a predetermined number of read attempts, it may be provided that the first assembly part 12 is nevertheless made to proceed or is moved back to the open position.

With particular reference to FIGS. 19-22, the brewing unit further comprises a movable blade member 51 rotatably positioned facing the second assembly part 14. The blade member 51 is mounted on the support structure 20 whereby it is capable of rotating about an axis orthogonal to the output filter 143, indicated with y in the figures. The blade member 51 carries a first scraping element 52 on a side facing the second assembly part 14, and a second scraping element 53 on a side facing away from the second assembly part 14. The first scraping element 52 is used to scrape the second assembly part 14, and the second scraping element 53 is used to scrape the receptacle 13 of the first assembly part 12.

FIGS. 19-22 in particular clarify the synchronism between the movement of the first assembly part 12 and the movement of the blade member 51. The blade member 51 is capable of oscillating between a first angular end position, which in the following will be referred to as a lowered position and is represented for example in FIG. 19, and a second angular end position, which in the following will be referred to as a raised position and is represented for example in FIG. 22. In the lowered position, the blade member 51 is located below the second assembly part 14; in the raised position, the blade member 51 is located on one side of the second assembly part 14. The blade member 51 is configured to rotate from the lowered position to the raised position, or vice versa, during the stretch of rotational motion of the first assembly part 12, while remaining stationary during the stretch of translational motion of the first assembly part 12. This prevents interference between the two components during operation of the brewing unit 10.

Figure 23:
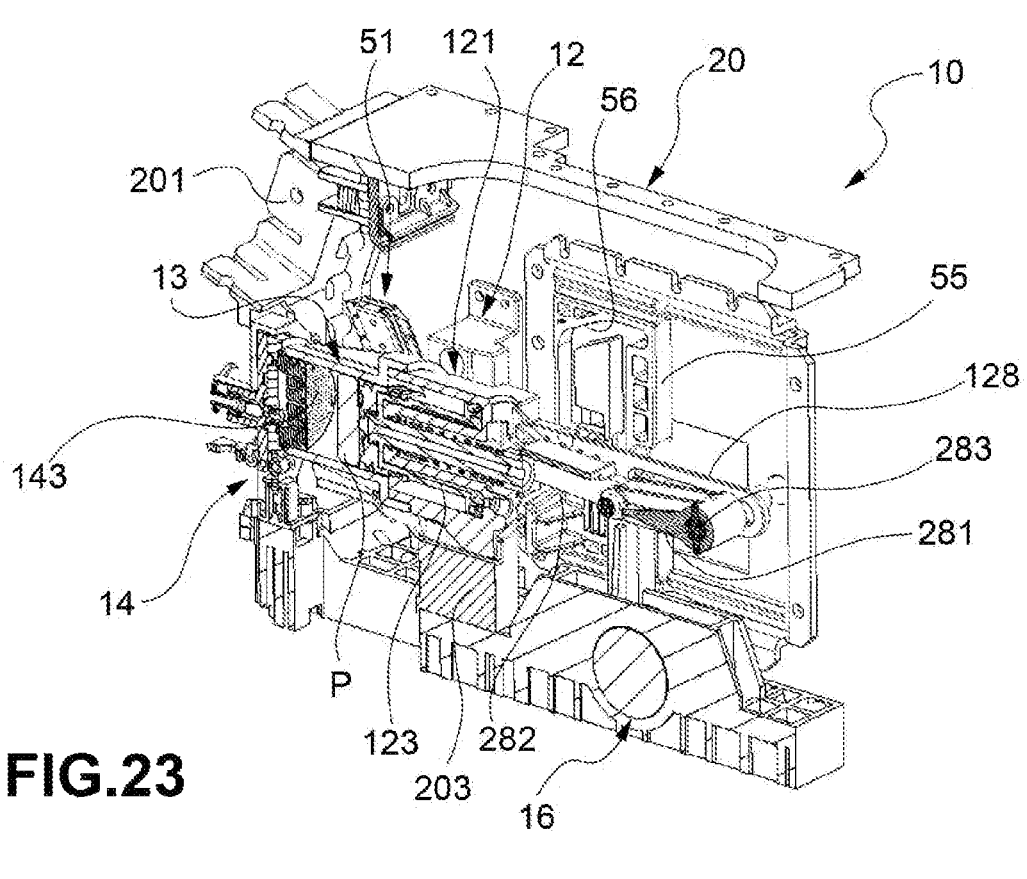
FIGS. 23 and 24 are additional cross-sectional views of the brewing unit.

The movement of the blade member 51 is controlled by the movement of the first assembly part 12 via an auxiliary transmission 54 connected to the driving mechanism 18 and shown for example in FIGS. 2-5. The auxiliary transmission 54 comprises a control plate 55, which is slidably mounted on the support structure 20 along a horizontal direction (see also FIGS. 23 and 24). As is shown in FIG. 24, the control plate 55 is arranged on the other side of the lateral wall 202 with respect to the first assembly part 12. The control plate 55 carries a cam groove 56, which is in turn engaged by the hinge pin extension 284 between the second toggle member 282 and the first assembly part 12. A rod 58, integral with the control plate 55, is connected to the blade member 51 by means of a helical coupling 99, which is configured to transform the translational motion of the rod 58 into the rotational motion of the blade member 51. The blade member may be associated with a first movable assembly part having a different motion than described above, and therefore the relevant auxiliary drive may be configured differently than described above.

The brewing unit 10 further comprises a stationary scraping member 61 positioned to intercept the receptacle 13 during the movement of the first assembly part 12 between the open position and the closed position. The stationary scraping member 61 is mounted on the support structure 20 above the seat 201 in which the optical sensor 40 is arranged.

An example of operation of the brewing unit 10 described above will now be described in detail.

According to this example, the working steps of the machine may be identified:

1. introduction of the tablet P into the receptacle 13;
2. electrical movement of the first assembly part 12;
3. readout position and recognition of the tablet P;
4. sweeping the outlet filter 143 in closing the assembly;
5. completion of the closure of the assembly;
6. advancing the tablet P to the outlet filter 143;
7. steps of pre-brewing, waiting, brewing, and compaction of the tablet P;
8. re-opening the assembly and ejecting the tablet P;
9. sweeping the inlet 126 and outlet 143 filters;
10. repositioning the receptacle 13 for the next cycle;
A. disassembling the receptacle 13 for cleaning;
B. cleaning cycle with reversal of the water flow on the filters.

As will be clarified hereinafter, the steps listed above are not necessarily sequential, and some of them overlap each other in their temporal development.

In step 1, the first assembly part 12 with the receptacle 13 is arranged vertically (see, for example, FIGS. 2 and 6). This arrangement allows the product, particularly the compacted tablet P, to be inserted into the receptacle 13 by a simple vertical drop-in insertion. Due to the fact that the spring 124 holds the plunger 123 with the brewing head 125 in a retracted position within the receptacle 13, it is possible to accommodate tablets of different heights in the receptacle 13.

The electrical movement of the assembly (step 2) takes place by means of the electric motor 16 positioned in the lower part of the machine. The motion is transmitted to the toggle mechanism 281, 282, which allows a 90° rotation and a rectilinear stroke of the receptacle 13 (FIGS. 3 and 4), through the gear mechanism comprising gear wheels 30 and 32. The cam member 38 arranged on the secondary gear wheel 32 allows the position sensor 34 to be activated, which signals to the electronic control unit ECU when to stop the motor 16 in order to carry out the other operations of the operating cycle.

During the movement from the open position to the closed position, the first assembly part 12 reaches the tablet P readout and recognition position (step 3). This position is necessary to allow the system to recognize the presence of the tablet P inside the receptacle 13 before completing the closure of the dispensing assembly and to recognize the type of tablet that has been inserted and adapt the timing of compacting and dispensing.

The detection/recognition position is detected by the protuberance 38c of the cam member 38 present on the secondary gear wheel 32, which activates the position sensor/microswitch 34. At this position, the electronic control unit ECU stops the electric motor 16 and the rotation of the unit for the time necessary for the system to recognize the presence and type of tablet.

During the movement from the open position to the closed position of the first assembly part 12, the outlet filter 143 (step 4) is swept by the blade member 51. The helical coupling 59 and the dimensions of the cam groove 56 of the control plate 55 allow the activation timing of the blade member 51 to be adjusted according to the position of the first assembly part 12. The same mechanism is tasked with the counter rotation of the blade member 51 so as to sweep the outlet filter 143 also in the step following dispensing (ejection of the used tablet), while the first assembly part 12 with the receptacle 13 is returned to the open position for the next cycle.

Figures 17, 18:
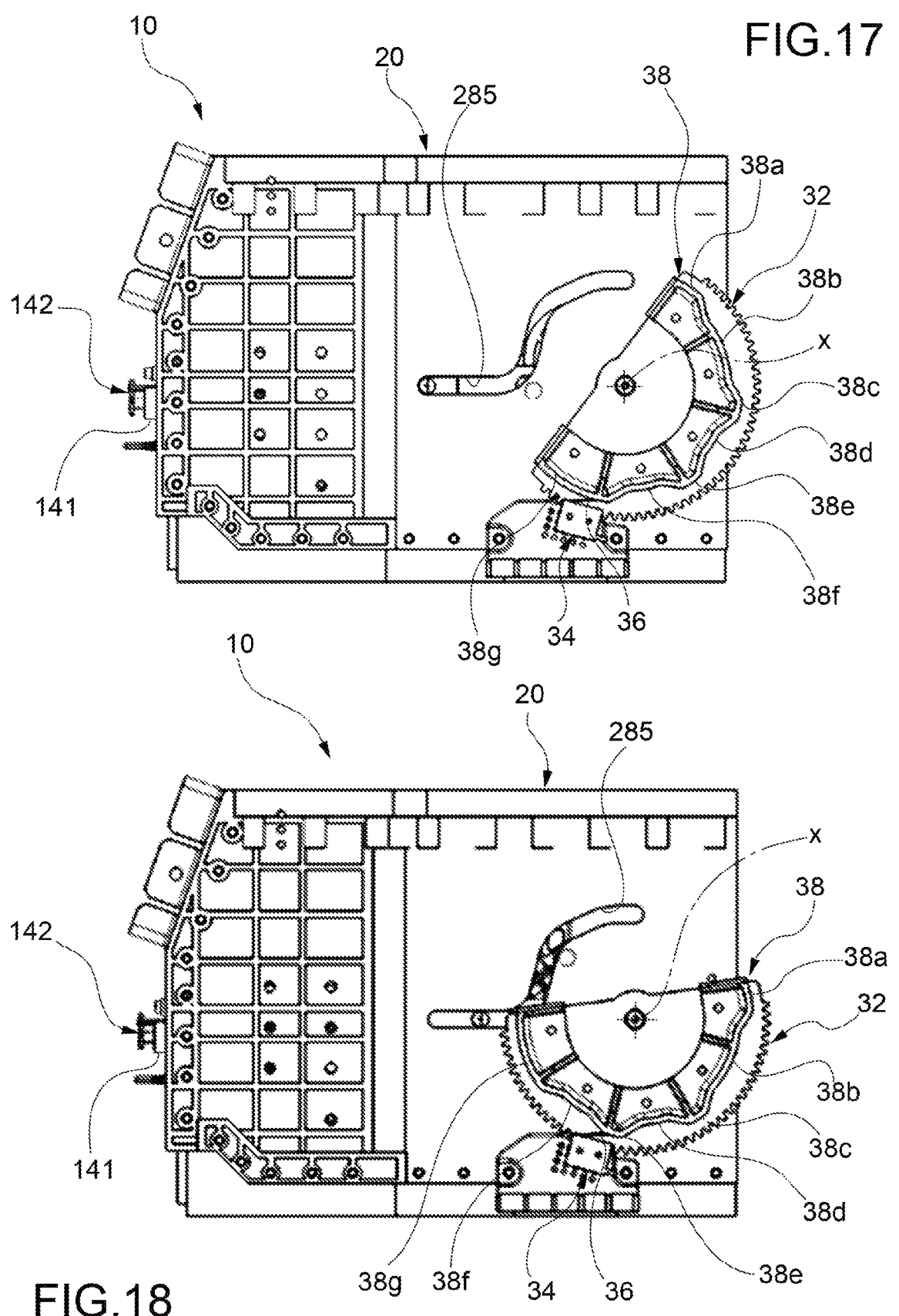
Figures 21, 22:
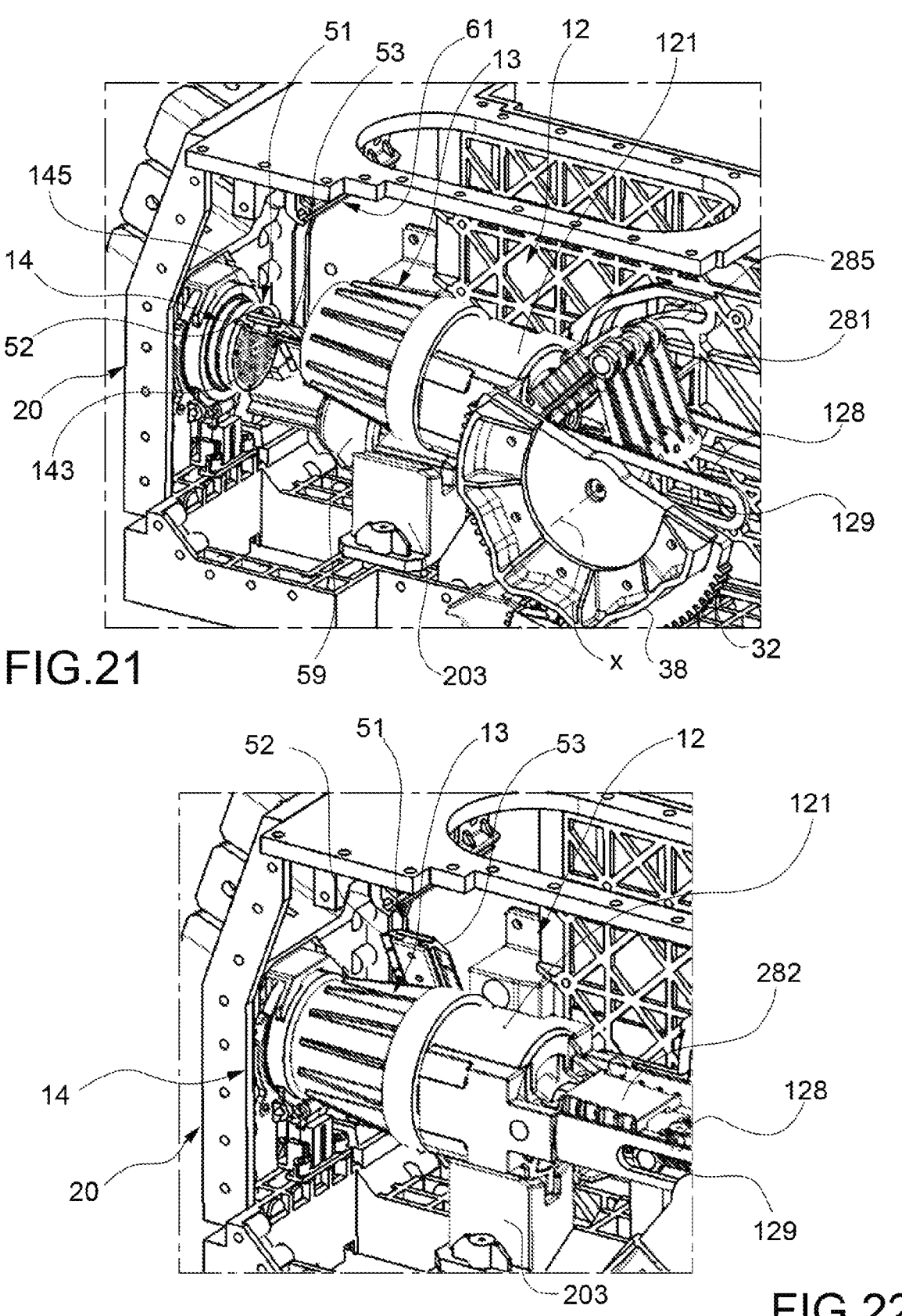

At the end of the rotational portion of the movement of the first assembly part 12, the first assembly part 12 comes to rest on a sliding block 203 arranged on the bottom of the support structure 20. From this point until the closed position is reached, the first assembly part 12 is limited to performing an exclusively translational motion. The closed position of the dispensing assembly is identified through the protuberance 38g of the cam member 38 dedicated to this position and present on the secondary gear wheel 32 (FIGS. 4 and 17). In this position, the receptacle 13 is fitted on the second assembly part 14. This position is maintained by stopping the motor 16 and placing the toggle mechanism in its dead center (irreversibility condition), for the duration of the steps that make up the beverage dispensing.

Figure 25:
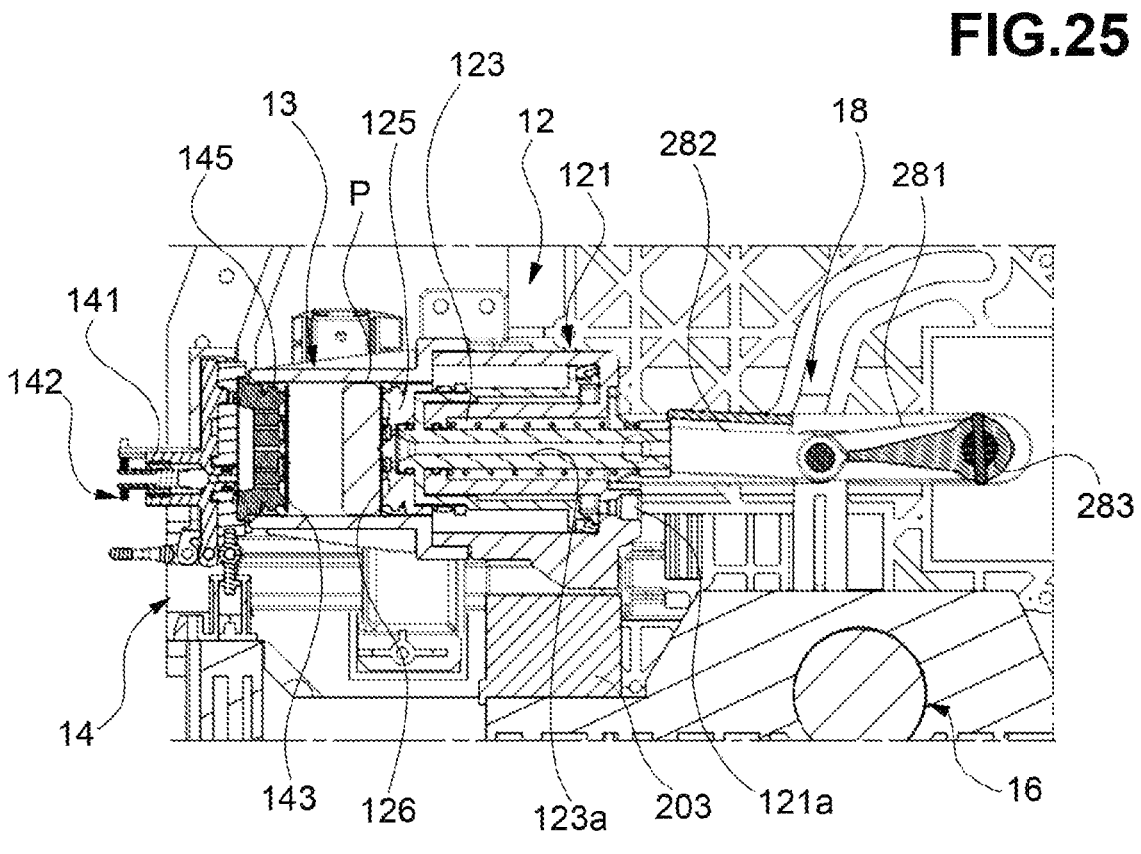
FIGS. 25 to 30 are cross-sectional views illustrating the steps for advancing a tablet to a second assembly part, pre-brewing, brewing, and compaction of the tablet, as well as reopening the assembly and ejecting the tablet.
Figure 26:
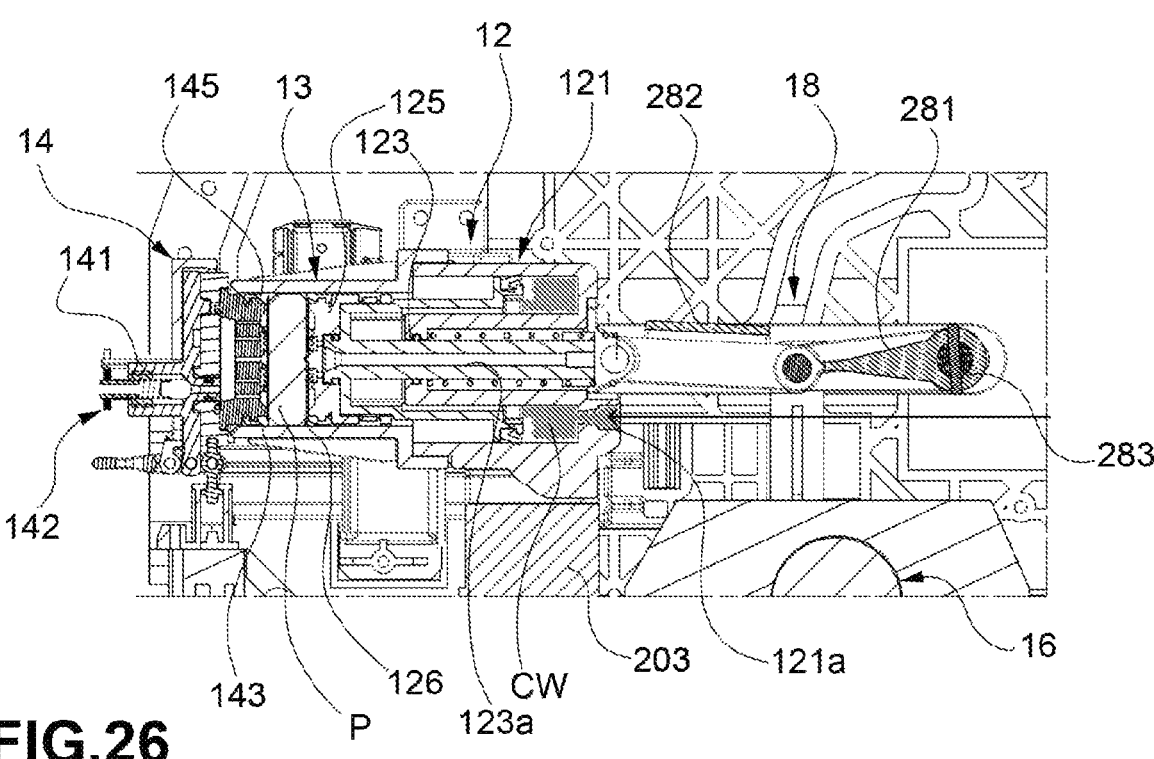

Referring to FIGS. 25 and 26, the movement of the tablet P closer to the outlet filter 143 and the automatic adjustment according to the height of the tablet (step 6) occur due to the hydraulic cylinder 121 located at the rear of the receptacle 13 and the hot water inlet filter 126.

Compaction is accomplished by pumping cold water CW from a tank (not shown) to the hydraulic cylinder 121 which will be maintained under pressure until the used tablet P is ejected. The tablet P is considered in abutment with the outlet filter 143 as the cold water CW pressure sent to the hydraulic cylinder 121 increases.

Different volumes of water will be sent into the hydraulic cylinder 121 for different tablet heights. For this purpose, the running time of the pump is measured to define the volume of water sent inside the hydraulic cylinder. Alternatively, volumetric metering may be performed using a flow meter.

More generally, it is possible to use doses of powdered product in different forms (compacted tablets, capsules, or simple bulk product) and different sizes for different preparations (espresso, long, double, filter). The recognition system provided by the sensor 40 and the control unit ECU may be configured to set different extraction parameters depending on the dose size and possibly skip one or more of the steps in the extraction, as will be clarified below.

Figures 27, 28, 29:
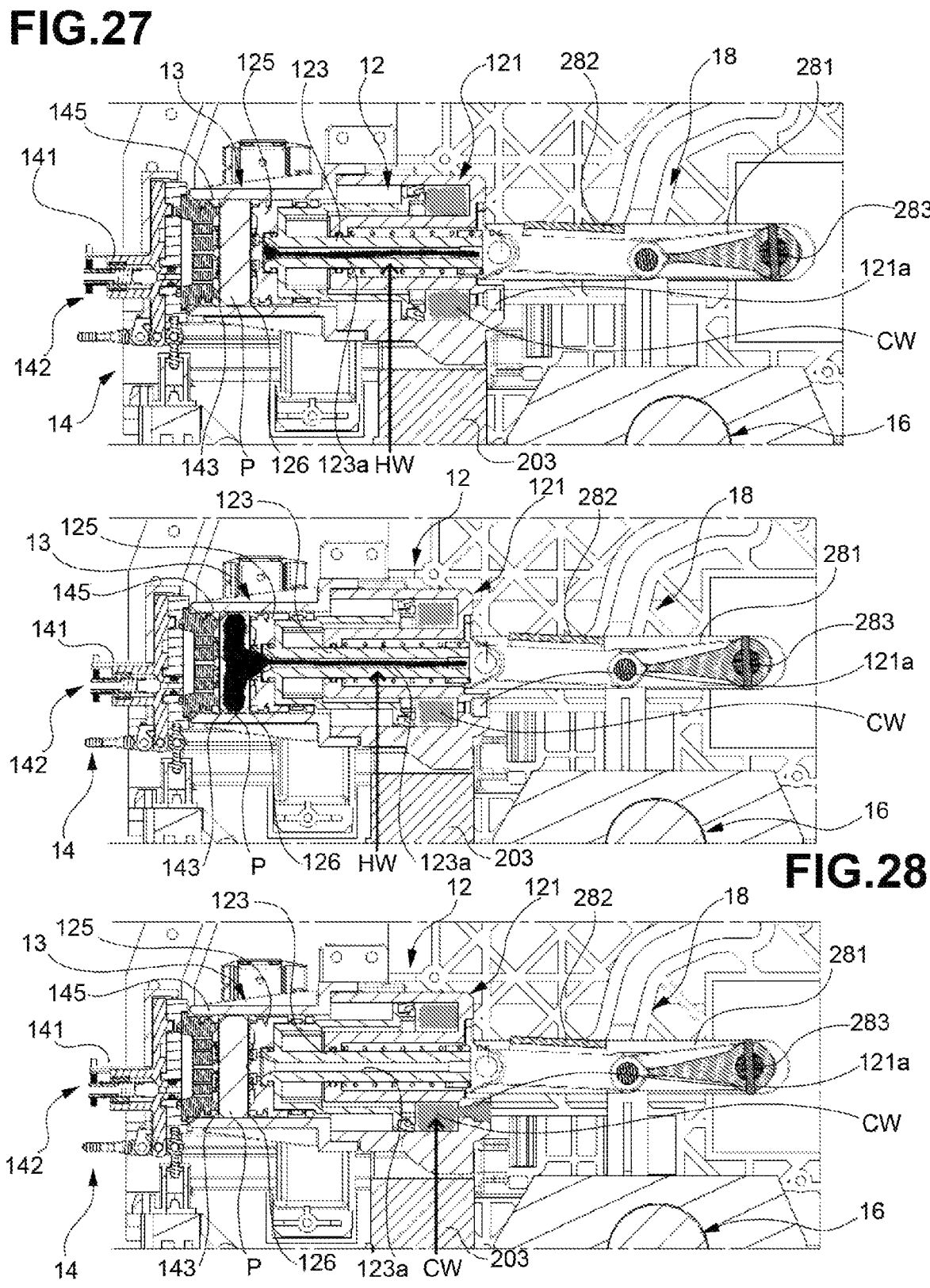

Referring to FIGS. 27-29, the beverage dispensing usually, but not necessarily, comprises three distinct sub-steps: pre-brewing and waiting, brewing, and compaction of the tablet (step 7).

In the pre-brewing and waiting step (FIG. 27), an initial, small amount of hot water HW is sent into the brewing chamber through the central duct 123a of the plunger 123, an amount that is unable to open the pre-brewing valve 142. Injecting this small amount of water and waiting afterward serves to wet and prepare the tablet P for the brewing step.

In the brewing step (FIG. 28), a second amount of hot water HW is sent to the tablet P, which may open the pre-brewing valve 142. In this step the volume of hot water is much greater than in the previous step and is used to dispense the correct amount of beverage depending on the tablet that has been inserted into the receptacle 13. The pressure exerted by the plunger 123 of the hydraulic cylinder 121 is maintained throughout the pre-brewing and brewing steps.

In the compaction step (FIG. 29), the hot water inlet is closed, and cold water is sent into the hydraulic cylinder 121 in order to compact and drain the hot water remaining in the used tablet.

During all of the sub-steps described above, the assembly remains in the closed position while keeping the motor stopped and the toggle mechanism in its dead center.

Depending on the type of powdered product used, one or more of the above steps may be absent. In particular, in the case of filter preparation or soluble coffee, the compaction and pre-brewing steps are skipped. In other cases, post-compaction may not be required. In this regard, the control unit ECU may be configured to selectively enable or disable one or more of the steps described above based on recognition of the product type, carried out after processing of the digital image captured by the sensor 40.

The compaction step is provided by the action of the pre-brewing valve 142. It is possible to selectively provide for a removal or a bypass of this valve in order to carry out dispensing without activation of the pre-brewing valve 142 (for example in the case of using filter preparation) by not performing the compacting step.

Once the beverage dispensing is complete, the used tablet P must be ejected to allow a new tablet to be inserted into the receptacle 13 for the next dispensing (step 8).

To this end, the electric motor 16 is placed in reverse rotation to bring the first assembly part 12 into an ejection and discharge position (FIGS. 5 and 18). The ejection position is identified by the protuberance 38e of the cam member 38 dedicated to that position and present on the gear wheel 32. At this position, the electric motor 16 is stopped, and additional cold water CW is fed into the hydraulic cylinder to advance the plunger 123 to an end stroke position (FIG. 30), at which the outlet filter 143 is substantially level with an end edge of the receptacle 13. The pressure in the hydraulic cylinder 121 will be maintained until the open position of the first assembly part 12 is reached.

Figures 30, 31:
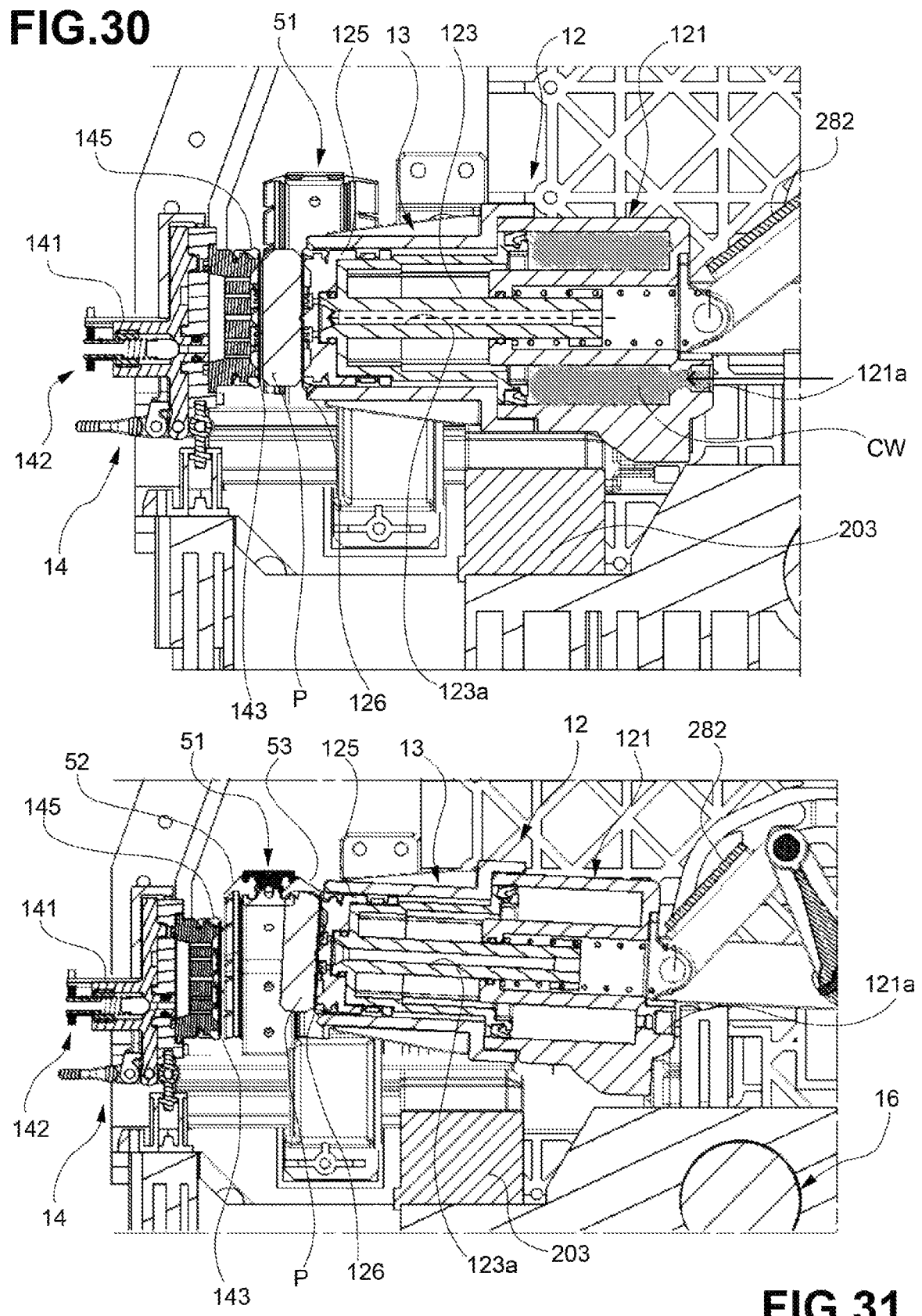
FIGS. 31 and 32 are cross-sectional views illustrating the steps for cleaning the assembly and detaching the tablet.

Cleaning following beverage dispensing is performed on both filters 126 and 143 by the blade member 51 and the scraping member 61. In the step of reopening the dispensing assembly, the blade member 51 performs a rotational motion reversed from that described above. The blade member 51, therefore, in addition to sweeping the outlet filter 143, interferes with the used tablet P, causing it to detach and fall into a compartment below (FIG. 31).

Figures 32, 33:
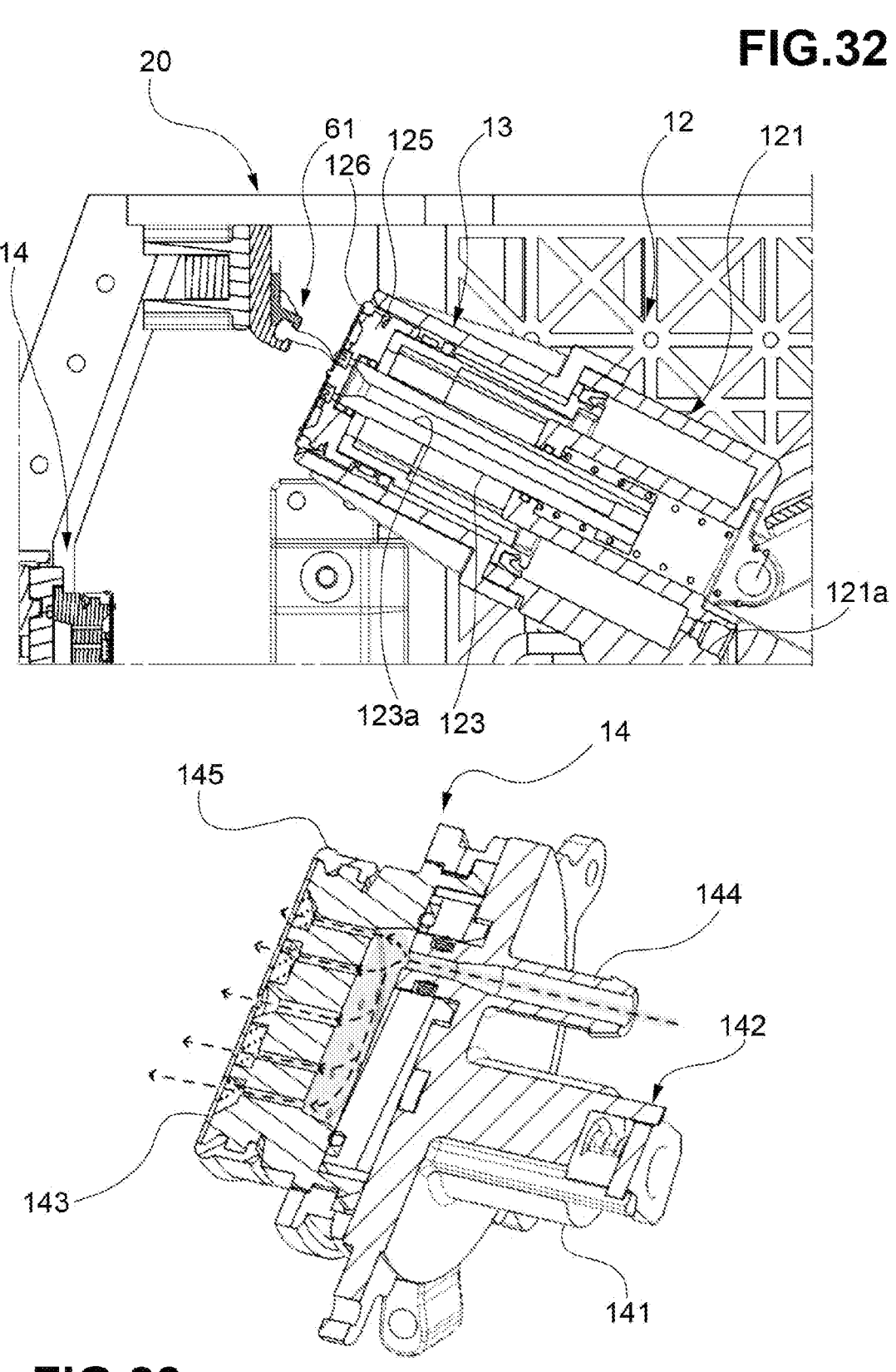
FIG. 33 is a cross-sectional view of the second assembly part.

Continuing the rotational motion to return to the open position, the receptacle 13 with the inlet filter 126 in the maximum forward position is swiped against the scraping member 61 (FIG. 32).

Due to the devices described above, any dust that settles on filters 126 and 143 and does not remain attached to the used tablet during the compaction step is removed and dropped into the used tablet collection compartment.

After passing the fixed scraping member 61 for cleaning the inlet filter 126, cold water present in the hydraulic cylinder 121 is allowed to return to the tank for use in a subsequent cycle. Since there are several frictions due to the different gaskets mounted in the first assembly part 12, the spring 124 allows the inlet filter 126 to return to its position for the next cycle, i.e., to the position in FIG. 6, once the pressure is released within the hydraulic cylinder 121.

Figures 15, 16:
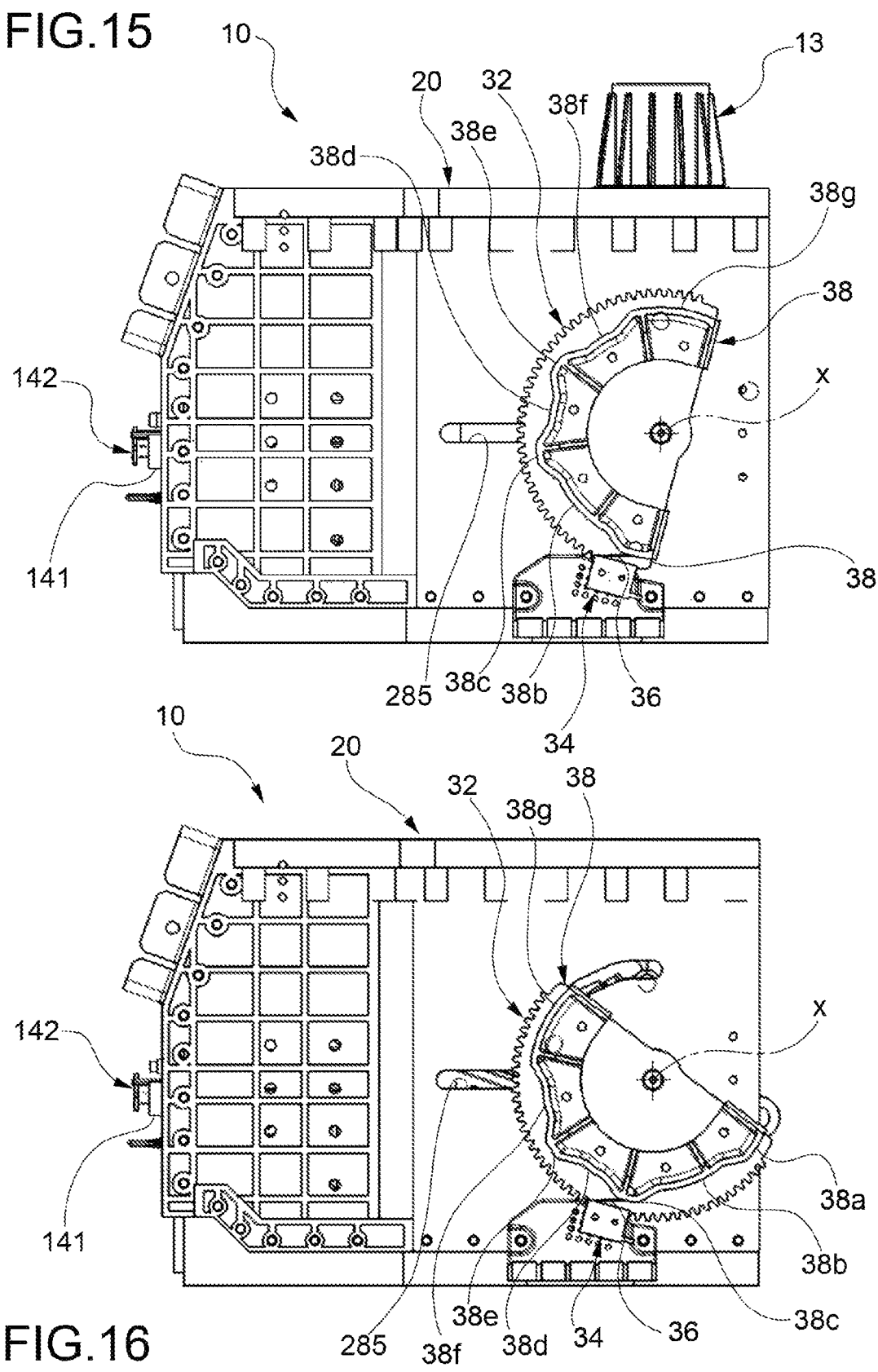
FIGS. 15 to 18 are side elevation views of the brewing unit, showing different cam member operating positions, respectively corresponding to the operating positions of the dispensing assembly shown in FIGS. 2 to 5.

Also in this case, the determination that the open position has been reached is made by a protuberance of the cam member 38, i.e., the protuberance indicated with 38a in FIG. 15, which allows the motor 16 to be stopped in the correct position.

The receptacle 13 together with the brewing head 125 may only be disassembled when the assembly is in the open position. To disassemble, it is necessary to rotate the receptacle 13 by a certain angle (in the direction of the arrows shown in FIG. 9b) so as to bring the teeth 13a into the release position. Once this has been done, the receptacle 13 and brewing head 125 may be slipped off as a single unit.

The brewing head 125 is removed together with the receptacle 13 by means of the constraining teeth 13b (FIG. 10) located on a radially inner surface of the receptacle 13, which—in the open position of the first assembly part 12—block the rotation of the brewing head 125 and constrain said brewing head to the receptacle 13. Once the receptacle 13 has been slid out, the brewing head may be slid therein and removed from the receptacle 13.

After cleaning the brewing head 125 with the inlet filter 126, the components may be reassembled by following the disassembly steps in reverse and making sure to keep the brewing head 125 at the end of the stroke. Proper assembly of the brewing head 125 is confirmed by a click once it is remounted on the plunger 123.

Figure 34:
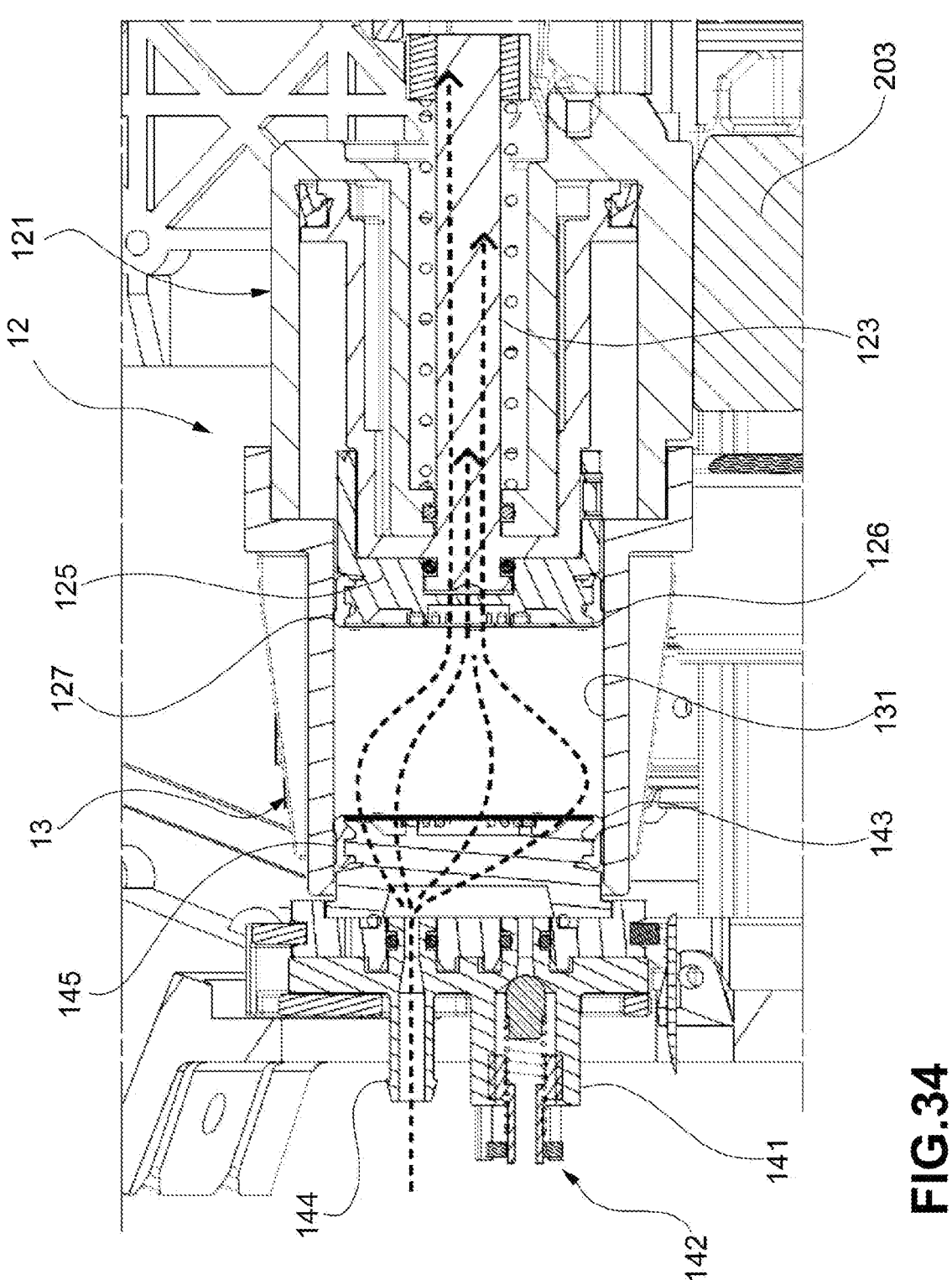
FIG. 34 is a cross-sectional view illustrating a method of cleaning the dispensing assembly.

An alternative for cleaning the filters is to reverse the normal flow of water from the inlet filter 126 to the outlet filter 143. In this case, the dispensing unit is brought to the closed position without the presence of a tablet inside the receptacle 13. Once the closed position is reached, cold water is sent through a secondary passage 144 present on the second assembly part 14 (see FIG. 33). This passage allows the water to pass through the outlet filter 143 (where most dust accumulates) in reverse to normal operation, dislodging the accumulated dust. By sending a given volume of water necessary to clean both filters 126 and 143, but without pressurizing the brewing chamber (FIGS. 33 and 34), the receptacle 13 will be retracted far enough to create a small opening at the bottom and convey the water used for cleaning directly into the used tablet collection compartment. In FIGS. 33 and 34, the path of the cleaning water is represented by dashed arrows.

Naturally, without prejudice to the principle of the invention, the embodiments and the details of construction may be widely varied relative to that which has been described and illustrated purely by way of non-limiting example, without thereby departing from the scope of protection as described and claimed herein.

The invention claimed is:

1. A motorized brewing unit for preparing beverages from a powdered product containing at least one ingredient, comprising a support structure;

a dispensing assembly supported by the support structure and including:

a first assembly part movable relative to the support structure and comprising a receptacle adapted to receive said powdered product, and a second assembly part, relative to which the first assembly part is movable between an open position in which the first assembly part and the second assembly part are spaced apart from each other to allow said powdered product to be inserted into the receptacle, and a closed position in which the first assembly part and the second assembly part are coupled to each other to define a brewing chamber therebetween;

an electric motor adapted to control movement of the first assembly part relative to the second assembly part between the open position and the closed position; and a readout device adapted to provide a digital image of said powdered product, said readout device comprising an optical sensor housed in a seat formed on the support structure and spaced apart from the second assembly part, the receptacle facing the optical sensor when the first assembly part is in a detection position, intermediate between the open position and the closed position.

2. The motorized brewing unit of claim 1, wherein said optical sensor is capable of detecting said powdered product in a static or dynamic manner.

3. The motorized brewing unit of claim 1, further comprising an electronic control unit (ECU) configured to adjust brewing parameters based on said digital image of the powdered product.

4. The motorized brewing unit of claim 3, wherein said electronic control unit (ECU) is configured to determine a dose size of the powdered product from said digital image and adjust said brewing parameters as a function of said dose size.

5. The motorized brewing unit of claim 1, wherein the first assembly part further comprises a plunger hydraulically operated and slidable within the receptacle, said plunger carrying a brewing head adapted to inject water into the brewing chamber, and wherein a gasket sealingly slidable on a radially inner surface of the receptacle is arranged on the brewing head.

6. The motorized brewing unit of claim 5, further comprising a spring interposed between the plunger and a hydraulic cylinder fixed to the receptacle, said spring being adapted to bias the plunger towards a retracted position.

7. The motorized brewing unit of claim 6, further comprising a driving mechanism interposed between the electric motor and the first assembly part, wherein in said closed position the driving mechanism is in a dead center position.

8. The motorized brewing unit of claim 7, wherein the driving mechanism is configured to rotate the first assembly part about a horizontal axis, during a first stretch of movement between the closed position and the open position, and move the first assembly part along a direction of translational motion orthogonal to said horizontal axis, during a second stretch of movement between the closed position and the open position.

9. The motorized brewing unit of claim 8, wherein, in the closed position of the first assembly part, the plunger is slidable along a direction parallel to said direction of translational motion of the first assembly part.

10. The motorized brewing unit of claim 1, further comprising a blade member, positioned in a rotating manner facing the second assembly part.

11. The motorized brewing unit of claim 10, wherein the blade member is connected to a driving mechanism through an auxiliary transmission.

12. The motorized brewing unit of claim 11, wherein the blade member is capable of pivoting between a first terminal angular position, hereinafter lowered position, and a second terminal angular position, hereinafter raised position, wherein in the lowered position the blade member is under the second assembly part, and in the raised position the blade member is alongside the second assembly part.

13. The motorized brewing unit of claim 11, wherein the blade member is configured to rotate from the lowered position to the raised position, or vice versa, during the first stretch of movement of the first assembly part and stand still during the second stretch of movement of the first assembly part.

14. The motorized brewing unit of claim 10, wherein the blade member is configured to remove said powdered product from the receptacle, in a condition wherein, following a brewing step, the first assembly part is moved away from the second assembly part and said powdered product is carried to an end edge of the receptacle.

15. The motorized brewing unit of claim 10, wherein the blade member is configured to scrape or sweep an inlet filter of the first assembly part and/or an outlet filter of the second assembly part, in a condition wherein, following a brewing step, the first assembly part is moved away from the second assembly part and said inlet filter is carried to an end edge of the receptacle.

16. The motorized brewing unit of claim 1, further comprising a stationary scraping member to intercept the receptacle during movement of the first assembly part between the open position and the closed position.

17. A method for preparing a beverage from a powdered product containing at least one ingredient, with a motorized brewing unit comprising a dispensing assembly that includes a first assembly part comprising a receptacle adapted to receive said powdered product, and a second assembly part, relative to which the first assembly part is movable between an open position in which the first assembly part and the second assembly part are spaced apart from each other to allow said powdered product to be inserted into the receptacle, and a closed position in which the first assembly part and the second assembly part are coupled to each other to define a brewing chamber therebetween, an electric motor adapted to control movement of the first assembly part relative to the second assembly part between the open position and the closed position, the motorized brewing unit further comprising a readout device adapted to provide a digital image of said powdered product, said readout device comprising an optical sensor, the receptacle facing the optical sensor when the first assembly part is in a detection position, intermediate between the open position and the closed position, wherein the first assembly part further comprises a plunger hydraulically operated and slidable within the receptacle, said plunger carrying a brewing head adapted to inject water into the brewing chamber, and wherein a gasket sealingly slidable on a radially inner surface of the receptacle is arranged on the brewing head, said method comprising the following steps:

a) with the first assembly part in the closed position, supplying cold water to a hydraulic cylinder to move the plunger forward and carry said powdered product against the second assembly part, b1) through the plunger and the brewing head, supplying optionally a first quantity of heated water into the brewing chamber to wet the powdered product, b2) waiting optionally a predetermined time interval, c) through the plunger and the brewing head, supplying a second quantity of heated water, greater than said first quantity, into the brewing chamber to prepare the beverage, and d) supplying optionally further cold water to the hydraulic cylinder to move the plunger further forward and compact a used powdered product against the second assembly part.

18. The method of claim 17, wherein an electronic control unit (ECU) is configured to selectively enable or disable at least one of steps b1, b2 and d based on a digital image of the powdered product.

19. The method of claim 17, further comprising:

translationally moving the first assembly part away from the second assembly part, and supplying further cold water to the hydraulic cylinder to move the plunger further forward and take the used powdered product outside of the receptacle.

20. A method for preparing a beverage from a powdered product containing at least one ingredient, with a motorized brewing unit comprising:

a dispensing assembly that includes:

a first assembly part comprising a receptacle adapted to receive said powdered product, and a second assembly part, relative to which the first assembly part is movable between an open position in which the first assembly part and the second assembly part are spaced apart from each other to allow said powdered product to be inserted into the receptacle, and a closed position in which the first assembly part and the second assembly part are coupled to each other to define a brewing chamber therebetween;

an electric motor adapted to control movement of the first assembly part relative to the second assembly part between the open position and the closed position; and a readout device adapted to provide a digital image of said powdered product, said readout device comprising an optical sensor, the receptacle facing the optical sensor when the first assembly part is in a detection position, intermediate between the open position and the closed position, wherein the first assembly part further comprises a plunger hydraulically operated and slidable within the receptacle, said plunger carrying a brewing head adapted to inject water into the brewing chamber, and wherein a gasket sealingly slidable on a radially inner surface of the receptacle is arranged on the brewing head, said method comprising the following steps:

through the plunger and the brewing head, supplying a quantity of heated water into the brewing chamber to prepare the beverage in an infusion step, wherein the brewing head exerts a pressure on the powdered product inserted in the receptacle throughout the brewing step.

* * * * *